US007817899B2

(12) United States Patent
Kadono

(10) Patent No.: US 7,817,899 B2
(45) Date of Patent: Oct. 19, 2010

(54) MOVING PICTURE DECODING APPARATUS USING REPLACEMENT IMAGE DATA

(75) Inventor: Shinya Kadono, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 1360 days.

(21) Appl. No.: 11/287,275

(22) Filed: Nov. 28, 2005

(65) Prior Publication Data

US 2006/0078056 A1 Apr. 13, 2006

Related U.S. Application Data

(62) Division of application No. 09/667,241, filed on Sep. 22, 2000, now Pat. No. 6,999,673.

(30) Foreign Application Priority Data

Sep. 30, 1999 (JP) ................................. 11-280183

(51) Int. Cl.
*H04N 5/93* (2006.01)
(52) U.S. Cl. ..................... 386/49; 386/113; 375/240.27
(58) Field of Classification Search ................... 386/46, 386/95, 113, 124, 47, 49; 348/616, 607; 375/240.27
See application file for complete search history.

(56) References Cited

U.S. PATENT DOCUMENTS 5,353,059 A 10/1994 Lawlor et al.
5,416,600 A * 5/1995 Matsumi et al. ............. 386/112
6,208,803 B1 * 3/2001 Shimizu ..................... 386/116
6,683,988 B1 * 1/2004 Fukunaga et al. ........... 382/236

(Continued)

FOREIGN PATENT DOCUMENTS

EP 0782347 * 7/1997

(Continued)

OTHER PUBLICATIONS

Talluri, R. et al., "A Robust, Scalable, Object-Based Video Compression Technique for Very Low Bit-Rate Coding", IEEE Transactions on Circuits and Systems for Video Technology, IEEE Inc., New York, U.S., vol. 7, No. 1, Feb. 1, 1997, pp. 221-233, XP00678893, ISSN: 1051-8215, p. 223, Right-hand col., Line 30*-p. 229, Right-hand col., Line 25-p. 230, Left-hand col., Line 10.

(Continued)

*Primary Examiner*—David E Harvey
(74) *Attorney, Agent, or Firm*—Wenderoth, Lind & Ponack, L.L.P.

(57) ABSTRACT

A moving picture decoding apparatus is provided which reduces the deterioration in image quality due to errors by a concealment processing for decoded image data, thereby improving the image quality of decoded images, without causing high deterioration in image quality resulting from the concealment processing. The moving picture decoding apparatus includes a decoder for decoding an input stream for each macroblock and generating decoded image data, a transmission error detector for detecting a transmission error in the input stream, and a stream error detector for detecting a stream error in the input stream. When the transmission error is detected, the moving picture decoding apparatus conceals the decoded image data in macroblock units and when the stream error is detected, the moving picture decoding apparatus conceals the decoded image data in video packet units.

12 Claims, 13 Drawing Sheets

U.S. PATENT DOCUMENTS 6,959,020 B1 * 10/2005 Hourunranta et al. ....... 370/542

FOREIGN PATENT DOCUMENTS

| EP | 0 790 741 | 8/1997 |
|---|---|---|
| JP | 5-161128 | 6/1993 |
| JP | 2000-50269 | 2/2000 |

OTHER PUBLICATIONS

Brailean, J., "Wireless Multimedia Utilizing MPEG-4 Error Resilient Tools", Wireless Communications and Networking Conference, 1999. WCNC. 1999 IEEE New Orleans, LA, U.S.A., Sep. 21-24, 1999, Piscataway, NJ, U.S.A., IEEE, U.S., Sep. 21, 1999, pp. 104-108, XP010353765, ISBN: 0-7803-5668-3, Section "II. MPEG-4 Resynchronization Syntax", Section "IV. MPEG-4 Data Recovery", Subsection "C. Concealment".

Frater, M.R., et al., "Error Concealment for Arbitrarily Shaped Video Objects", Image Processing, 1998. ICIP 98. Proceedings. 1998 International Conference on Chicago, IL, U.S.A. Oct. 4-7, 1998, Los Alamitos, CA, U.S.A., IEEE Comput. Soc., U.S., Oct. 4, 1998, pp. 507-511, XP010309058, ISBN: 0-8186-8821-1, *p. 507, Right-hand col., Line 30-p. 508, Right-hand col., Line 28*.

Shirani, S., et al., "Error Concealment for MPEG-4 Video Communication in an Error Prone Environment", 2000 IEEE International Conference on Acoustics, Speech, and Signal Processing. Proceedings (Cat. No. 00CH37100), Proceedings of 2000 International Conference on Acoustics, Speech and Signal Processing, Istanbul, Turkey, Jun. 5-9, 2000, Jun. 5, 2000, pp. 2107-2110, XP010504714 2000, Piscataway, NJ, U.S.A. IEEE, U.S.A., *Sections 1.-3.*

Wang, Y., et al., "Error Resilient Video Coding Techniques—Real-Time Video Communications Over Unreliable Networks", IEEE Signal Processing Magazine, IEEE Inc., New York, U.S., Jul. 2000, pp. 61-82, XP002951457 ISSN: 1053-5888, *p. 80, Left-hand col., Line 3—p. 80, Left-hand col., Line 22*.

* cited by examiner

Sob

Tob

MOVING PICTURE DECODING APPARATUS USING REPLACEMENT IMAGE DATA

This application is a divisional of U.S. application Ser. No. 09/667,241, filed Sep. 22, 2000 now U.S. Pat. No. 6,999,673.

FIELD OF THE INVENTION

The present invention relates to a moving picture decoding method, a moving picture decoding apparatus, and a recording medium which contains a program. More particularly, it relates to a process of concealing decoded image data which are obtained by decoding a bitstream which includes an error, so as to obtain visually preferable decoded images.

BACKGROUND OF THE INVENTION

In recent years, we entered the age of multimedia in which voices, images and other representative media are integratedly operated, and means for transmitting information of conventional information media, such as newspapers, magazines, television, radio and telephone, to persons have been adopted as targets of the multimedia. The multimedia generally means representing not only characters but also drawings, voices, particularly images and the like, which are simultaneously correlated with the characters. However, in order to make the conventional information media the targets of the multimedia, it is indispensable to represent the information in digital formats.

Estimating the amount of the information in each of the information media as a digital information amount, the information amount of characters (per character) is 1~2 bytes, the information amount of voices of telephone quality is 64 Kbits per second, and the information amount of moving pictures of the current television receiving quality is 100 Mbits per second. Accordingly, in information media such as the telephone and television, it is not practical that massive information in digital formats is operated as it is. For example, TV phones have already been put to practical use by ISDN (Integrated Service Digital Network) having the transmission rate of 64 kbps~1.5 Mbps. However, video information which is obtained by TV cameras cannot be transmitted as digital data as it is by the ISDN.

Thus, technology for compressing information is required. For example, in the case of TV phones, the moving picture compression technology according to H.261 and H.263 standards which are internationally standardized by ITU-T (International Telecommunication Union-Telecommunication Sector) is employed. In addition, according to the information compression technology of MPEG-1 standard, image information can be stored in normal music CDs (Compact Disks) together with voice information.

Here, MPEG (Moving Picture Experts Group) is the international standard relating to the processing for compressing moving picture data. MPEG-1 is the standard for compressing moving picture data in up to 1.5 Mbps, i.e., compressing information of television signals by about one hundredth. Further, the transmission rate for MPEG-1 standard is principally restricted to about 1.5 Mbps. The moving picture data are compressed into 2~15 Mbps according to MPEG-2 which is standardized to meet requirements of higher image quality.

Further, in the present circumstances, MPEG-4 which enables coding of image data and operation of image data in object units, and realizes new functions required in the age of multimedia is now being standardized by a working group (ISO/IEC JTC1/SC29/WG11) that has promoted the standardization of the compression processing for moving picture data, like MPEG-1 and MPEG-2. In MPEG-4, the standardization of the coding processing at a lower bit rate has been aimed at first, but at the present time the targets of the standardization are extended to general-purpose coding processing for interlaced images at a higher bit rate.

One of characteristics of MPEG-4 is a mechanism for simultaneously coding image data corresponding to plural image sequences (i.e., plural moving pictures) and transmitting them. This mechanism makes it possible to construct one scene by composing plural images. The image in this case is an image (still picture) of each frame of the image sequence (moving picture). One scene is a composed image including plural images.

For example, in MPEG-4, it is possible that the foreground and background constituting one scene are separated as images (objects) of different image sequences and that the frame frequency, image quality and bit rate are changed independently for each of the image sequences. In addition, in MPEG-4, the images of the plural image sequences are arranged in the horizontal or vertical direction, like multi-screens, whereby users can extract or enlarge to display only images of desired image sequences.

As for the background, the coding processing only for pixel value signals (texture signals) indicating the brightness and tint is generally performed, as in MPEG-2. On the other hand, as for the foreground, the processing of not only coding the pixel value signals indicating the brightness and tint of the objects but also simultaneously coding shape signals indicating shapes of the objects is performed. Generally, this coding processing for the foreground is known as coding processing in object units.

According to MPEG-4, the whole of a displayed image (composed image) is composed of images (objects) of plural image sequences. Therefore, a frame of each image sequence at each display time is referred to as a VOP (Video Object Plane) and distinguished from frames according to MPEG-1 and 2. When the whole of the displayed image is composed of images of one image sequence, the VOP and the frame coincide.

FIGS. 8(a) to 8(c) are diagrams for schematically explaining coding processing in object units according to MPEG-4.

An image signal specified according to MPEG-4 is composed of a shape signal representing the shape Sob of an object (VOP) (FIG. 8(a)) and a pixel value signal (texture signal) comprising a brightness signal and a color difference signal, representing the texture Tob of the object (VOP) (FIG. 8(b)).

In the coding processing in object units, it is necessary to decide the shape of the object and the position of the object with respect to a reference coordinate system for displaying the image. Thus, a rectangular region (bounding box) Box (FIG. 8(c)) is composed of plural macroblocks, involving the object Ob, is decided by the reference coordinate system. Here, the macroblock is an image space as a unit of the coding processing, and composed of 16×16 pixels. In addition, since the rectangular region Box is composed of the plural macroblocks, the number of pixels in the horizontal and vertical directions in the rectangular region is a multiple of 16.

Then, each of the rectangular regions Box in one image sequence is subjected to the coding processing of coding the image signal for each macroblock.

For example, in FIG. 8(c), the rectangular region Box is composed of 5×4 macroblocks. Macroblocks MB1 and MB2 are macroblocks situated outside the object Ob (macroblock-outside-object). A macroblock MB3 is a boundary macroblock situated on the boundaries of the object Ob. A macroblock MB13 is a macroblock situated inside the object Ob (macroblock-inside-object). According to MPEG-4, pixels outside the object are not displayed after the decoding. Therefore, the coding processing is performed only for macroblocks including the pixels inside the object, which are displayed after the decoding, i.e., the boundary macroblocks and macroblocks-inside-object.

FIGS. 9(a) to 9(e) are diagrams for schematically explaining various processing units in a bitstream which conforms to MPEG-4.

Here, a rectangular region (bounding box) Box including an object (VOP) corresponds to the object in a one-to-one relationship. Therefore, in the following description, the rectangular region (bounding box) Box and the object (VOP) are not distinguished from each other and they are referred to as VOPs.

Generally, in a code sequence (bitstream) composed of variable length codes, fixed length codes comprising specific bit patterns are arranged to prevent the error propagation at the decoding time. According to MPEG-4, this fixed length code is referred to as Resync Marker (hereinafter abbreviated as only marker) and it is a synchronization signal. A code sequence composed of this marker and the variable length codes subsequent to the marker is a coding unit which is referred to as a video packet.

According to MPEG-4, as shown in FIG. 9(a), a code sequence (VOP bitstream) Svop corresponding to one VOP 10 can be composed of plural video packets. In this case, the VOP bitstream Svop is composed of four video packets Svp1~Svp4. Coded data corresponding to respective regions Rvp1~Rvp4 in the VOP 10 are stored in the video packets Svp1~Svp4, respectively. In addition, coded data corresponding to plural macroblocks can be stored in each of the video packets Svp1~Svp4.

Here, the region Rvp1 corresponding to the video packet Svp1 is composed of five macroblocks MB1~MB5 as shown in FIG. 9(b). Also each of the regions Rvp2~Rvp4 corresponding to the other video packets Svp2~Svp4 is composed of five macroblocks as the region Rvp1 corresponding to the video packet Svp1. In addition, each of the macroblocks is an image space composed of 16 pixels×16 pixels as described above and composed of four blocks. Each of the blocks is an image space composed of 8 pixels×8 pixels. For example, the macroblock MB1 is composed of blocks B1~B4 as shown in FIG. 9(c), and the block B1 is composed of 8 pixels×8 pixels as shown in FIG. 9(d).

In addition, the coded data corresponding to one macroblock (hereinafter referred to also as macroblock information) include brightness information (Y) which corresponds to the four blocks constituting one macroblock, and color difference information (U) and (V) corresponding to one macroblock. Further, when the object has the shape, the coded data of one macroblock include shape information corresponding to one macroblock, together with the brightness information (Y) and the color difference information (U) and (V).

Here, the brightness information (Y) of one macroblock is obtained by coding the pixel value signals of the four blocks constituting one macroblock. The color difference information (U) and (V) of one macroblock is obtained by coding the color difference signals (U) and (V) of 8 pixels×8 pixels constituting one macroblock, respectively. The shape information of one macroblock is obtained by coding the shape signal of 16 pixels×16 pixels constituting one macroblock.

It is unnecessary that the number of the macroblocks constituting the region corresponding to the video packet in the VOP 10 is always fixed as shown in FIG. 9(a). For example, as shown in FIG. 9(e), the numbers of macroblocks constituting regions Rvp1a~Rvp5a which correspond to video packets in a VOP 10a may be decided so that the amounts of codes in the respective video packets Svp1a~Svp5a in a VOP bitstream Svopa are fixed. In this case, the numbers of the macroblocks included in the regions Rvp1a~Rvp5a corresponding to the respective video packets are not fixed.

FIG. 10 is a diagram for schematically explaining the coding processing according to MPEG-4 in object units. This figure shows the coding processing for the image signal corresponding to the object (VOP) having the shape as shown in FIG. 8.

Here, the VOP 10 as the object Ob (strictly speaking Bounding Box BBOX including the object) is composed of four video packet regions Rvp1~Rvp4 each composed of five macroblocks. For example, the video packet region Rvp1 is composed of the macroblocks MB1~MB5.

The macroblocks MB1 and MB2 are situated outside the object. Therefore, these macroblocks MB1 and MB2 are subjected to the processing of coding the shape signal indicating that the macroblocks are outside the object as the coding processing for the shape signal, and the processing of coding the pixel value signal is omitted. In addition, the macroblock MB3 is subjected to the coding processing for the shape signal and the coding processing for the pixel value signal, because this macroblock is a macroblock including pixels inside the object.

Generally, many objects having the shapes as the foreground have the shapes or sizes varying from moment to moment, unlike objects as the background. In addition, according to MPEG-4, the coding algorithm of the shape signals or pixel value signals greatly depends on the shapes of the images to be coded. For example, when an object has the shape, the coding processing of the pixel value signal is omitted for a part (macroblock) which is indicated by the shape signal that it is outside the object. Therefore, there are some cases where the number of the macroblocks which are subjected to the coding processing of the pixel value signals, corresponding to one scene (VOP) of one image sequence may vary. Accordingly, the decoding processing conforming to MPEG-4 is easily affected by transmission errors of the bitstream, as compared with the decoding processing for the coding processing of images having the shapes and sizes which do not vary like MPEG-2. Further, in this decoding processing, the image concealment such as the image restoration or image processing utilizing the correlation between VOPs is also difficult. Consequently, in the decoding system for MPEG-4, when the transmission error occurs, the image quality in a decoded image is considerably deteriorated.

FIGS. 11(a) to 11(c) are diagrams for schematically explaining the structure of a bitstream which conforms to MPEG-4 in detail.

The VOP bitstream Svop includes coded data corresponding to the VOP 10 as the object Ob as shown in FIG. 10. At the head of the VOP bitstream Svop, a VOP header Svoph as important data relating to the whole VOP is arranged. The video packets Svp1~Svp4 are arranged subsequent to the VOP header Svoph (see FIG. 11(a)).

In the video packet Svp1, a video packet header Svph as important data relating to the whole video packet is arranged at its head. Coded data (macroblock information) Smb1~Smb5 corresponding to the macroblocks MB1~MB5 are arranged subsequent to the video packet header Svph (see FIG. 11(b)).

Further, a macroblock header Smbh as important data relating to the whole macroblock is arranged at the head of the macroblock information Smb1. Shape information Ssb, of the corresponding macroblock, brightness information Spb1~Spb4 of four blocks constituting the corresponding macroblock, and color difference information (U) Spbu and (V) Spbv of the corresponding macroblock are arranged subsequent to the macroblock header Smbh (see FIG. 11(c)).

Thus, in the VOP bitstream Svop, the macroblock information corresponding to the macroblock as the coding unit is the first processing unit. Further, the video packet composed of the plural pieces of macroblock information is the second processing unit. The VOP bitstream has a two-layer data structure in which the coded data included therein are divided by the first and second processing units.

Here, the VOP header Svoph and the video packet header Svph include synchronization signals for synchronizing the decoding processing of the bitstream. Thus, when the decoding processing of the bitstreams is interrupted due to an error bit in the bitstream, the decoding processing can be resumed from the VOP header Svoph or video packet header Svph. On the other hand, the macroblock header Smbh includes no synchronization signal for synchronizing the decoding processing. Here, the synchronization signal in the video packet header Svph is the above-mentioned fixed length code (Resync Marker).

Generally, as errors in the bitstream in the moving picture decoding processing, there are two kinds of errors, i.e., a stream error and a transmission error.

As the stream error, there is an error that a code which is grammatically incorrect is included in a stream (syntax error) or an error that a code of an incorrect value which exceeds a range of available values is included (semantic error) and the like. The transmission error is an error in which the bitstream is destroyed when the bitstream is read from a recording medium or the bitstream is transmitted via a communication medium due to the missing of data or the like.

Usually, the coded image data corresponding to each VOP are stored in a transmission packet having header information, and transmitted as the VOP bitstream in transmission packet units. Therefore, when the transmission error such as the absence of packets occurs, the position of a missing transmission packet in the bitstream can be detected on the receiving end. Accordingly, as for the transmission error, the position where the decoding processing fails in the bitstream (error occurrence position) can be almost specified.

As a concrete method for specifying the error occurrence position in the decoding processing, there is a method of detecting the absence of packets in the bitstream and adding a mark which indicates the absence of the packet (marker code) to the position of the missing packet in the bitstream.

Compared with this transmission error, the stream error results from the syntax error occurring at the variable-length coding time or the like. Therefore, this error cannot be detected as a decoding error until the decoding process such as the variable-length decoding processing fails. In other words, the stream errors cannot be detected essentially unless the decoding process of the bitstream (coded data) fails.

However, the synchronization signal is arranged at the head of one video packet. In addition, immediately after this video packet, the synchronization signal of the subsequent video packet is arranged. Therefore, when the structure and contents of the bitstream situated between these two synchronization signals are strictly examined in the decoding process, only video packets including the stream errors can be detected regardless of the failure of the decoding process of the bitstream. When the structure and contents of the bitstream are strictly examined in the decoding process in this way, the possibility of detecting the stream errors is considerably higher as compared with the case where the failure of the decoding process of the bitstream is detected.

Hereinafter, a conventional moving picture decoding apparatus will be described in detail.

FIG. 12 is a block diagram for explaining the conventional common moving picture decoding apparatus.

This moving picture decoding apparatus 100 receives a bitstream read from a recording medium or a bitstream transmitted via a transmission medium as an input stream Vin and performs decoding processing for the input stream Vin. Here, the bitstream includes image coded data which are obtained by subjecting an image signal of a moving picture to coding processing separately for each of plural image sequences constituting the moving picture. In addition, the coding processing for the image signal of one of the image sequences is performed for each scene (VOP) of the image sequence and the image signal corresponding to each VOP is coded in units of macroblocks constituting the VOP. It goes without saying that the image signal of the object having no shape includes only the brightness signal and the color difference signal, and the image signal of the object having the shape includes the shape signal together with the brightness signal and the color difference signal.

The bitstream corresponding to the moving picture normally includes the image coded data corresponding to each object being multiplexed. However, in the following description, assume that the bitstream includes only image coded data corresponding to one object as image information.

To be specific, the moving picture decoding apparatus 100 includes a decoder 101 for performing the decoding processing of the input stream Vin corresponding to a target VOP to be processed for each macroblock with reference to decoded image data (reference image data) Vref in a reference region in an already processed VOP whose decoding processing is finished, and outputting decoded image data Vd, and a memory 102 for synchronizing the reference image data Vref with decoding processing of a macroblock to be processed (target macroblock) in the target VOP, and outputting the data as well as synchronizing decoded image data (replacement image data) Vrep corresponding to a macroblock in the already processed VOP whose relative position in the already processed VOP is equal to the relative position of the target macroblock in the target VOP with the decoding processing for the target macroblock and outputting the data.

Further, the moving picture decoding apparatus 100 includes an error detector 120 for detecting an error of the input stream Vin and its position on the basis of the input stream Vin and outputting an error notification signal Terr, a selector switch 105 for selecting one of the decoded image data Vd of the target macroblock and the replacement image data Vrep in accordance with a control signal Cmb, and outputting the selected image data (MB selected image data) Emb as reproduced image data Vout of the target macroblock, and a macroblock unit concealer 104 for generating the control signal Cmb for the selector switch 105 in accordance with the error notification signal Terr.

Here, the error detector 120 detects the error in the input stream Vin using the level of the input stream Vin as an analog signal or an error-correcting signal included in the input stream. Therefore, in this error detector 120, the transmission errors are detected.

The macroblock unit concealer 104 controls the selector switch 105 in accordance with the error notification signal Terr so that in place of the decoded image data Vd which are obtained by decoding the macroblock information from the macroblock information including the error part of the input stream Vin to the subsequent synchronization signal, the decoded image data (replacement image data) Vrep of the already processed VOP corresponding to the decoded image data are output as the reproduced image data Vout.

Next, the operation of the moving picture decoding apparatus 100 is described.

When a bitstream read from the recording medium or a bitstream transmitted via the transmission medium is input to the moving picture decoding apparatus 100 as the input stream Vin, the decoding processing for the input stream is performed in macroblock units for each VOP in the moving picture decoding apparatus 100. Here, in this moving picture decoding apparatus 100, the decoder 101, the memory 102 and the macroblock unit concealer 104 are controlled by a control unit (not shown) in this apparatus 100 during the decoding processing so that the processings for the respective macroblocks are synchronized between these units.

To be specific, in the decoder 101, the decoding processing is performed for the coded data of the target macroblock in the target VOP, with reference to the reference image data Vref corresponding to the target macroblock, and the decoded image data Vd of the target macroblock are output. When the input stream Vin includes an error, the decoder 101 outputs only the decoded image data Vd corresponding to the macroblock whose coded data can be decoded.

At this time, the memory 102 outputs the replacement image data Vrep corresponding to the target macroblock together with the reference image data Vref corresponding to the target macroblock.

The error detector 120 performs error detection processing of detecting transmission errors on the basis of the input stream Vin. When the error of the input stream is detected, the error detector 120 outputs an error notification signal Terr which shows the macroblock information including an error part of the input stream as the position of the error part, to the macroblock unit concealer 104.

Then, the macroblock unit concealer 104 outputs the control signal Cmb to the selector switch 105 for selecting one of the decoded image data Vd of the target macroblock and the replacement image data Vrep corresponding to the target macroblock, in accordance with the error notification signal Terr. That is, the selector switch 105 is controlled so that the replacement image data Vrep from the memory 102 are selected, in place of the decoded image data Vd from the decoder 101, for the macroblock corresponding to each of macroblock information from the macroblock information indicated by the error notification signal Terr to the subsequent synchronization signal, and the decoded image data Vd output by the decoder 101 are selected for other macroblocks.

Then, the selected image data Emb which are selected by the selector switch 105 are output as the reproduced image data Vout corresponding to the target macroblock of the target VOP. In addition, the selected image data Emb are recorded in the memory 102 as the reference image data for a VOP subsequent to the target VOP.

At this time, not only the decoded image data of the error macroblock (macroblock whose macroblock information includes the error part of the bitstream) but also the decoded image data of all macroblocks subsequent to the error macroblock in the video packet are replaced with the decoded image data (replacement image data) Vrep of the corresponding macroblocks in the already processed VOP, because the input stream is obtained by the variable-length coding processing for the image data. To be specific, in the variable-length decoding processing for the input stream, when the input stream includes an error, the error affects the decoding processing for all of macroblock information from the error occurrence position in the input stream to the synchronization signal.

FIG. 13 is a block diagram for explaining another conventional moving picture decoding apparatus.

This moving picture decoding apparatus 110 conceals the decoded image data which are obtained by the decoding processing for the input stream which includes errors, not in macroblock units as in the moving picture decoding apparatus 100 but in video packet units.

To be specific, this moving picture decoding apparatus 110, like the moving picture decoding apparatus 100 shown in FIG. 12, has a decoder 101 for performing the decoding processing for the input stream Vin corresponding to the target VOP with reference to the reference image data Vref and outputting the decoded image data Vd corresponding to each macroblock, and a memory 102 for synchronizing the reference image data Vref and the replacement image data Vrep for the target macroblock with the decoding processing of the target macroblock and outputting the data.

Further, in place of the selector switch 105 in the moving picture decoding apparatus 100, the moving picture decoding apparatus 110 has a first delay circuit 103 for delaying the decoded image data Vd for a time required for the decoding processing of a target video packet to be processed, a second delay circuit 104 for delaying the replacement image data Vrep which are output by the memory 102 in synchronization with the decoding processing of each macroblock, for a time required for the decoding processing of the target video packet, and a selector switch 108 for selecting one of the output (delayed decoded data) DVd of the first delay circuit 103 and the output (delayed replacement data) DVrep of the second delay circuit 104, in accordance with a control signal Cvp.

Further, in place of the error detector 120 in the moving picture decoding apparatus 100, this moving picture decoding apparatus 110 has an error detector 121 for detecting the failure of the normal decoding processing in the decoder 101 in accordance with an internal signal Si of the decoder, and outputting an error notification signal Nerr indicating the error detection. This error detector 121 can have a structure for detecting the abnormality of the bitstream in the video packet by the processing of strictly examining the structure and contents of the bitstream, in place of the processing of detecting the failure of the normal decoding processing, and outputting the error notification signal Nerr indicating the error detection.

Further, in place of the macroblock unit concealer 104 in the moving picture decoding apparatus 100, this moving picture decoding apparatus 110 has a video packet unit concealer 107 for controlling the selector switch 108 to select one of the delayed decoded data DVd from the first delay circuit 103 and the delayed replacement data DVrep from the second delay circuit 104 for each macroblock, in accordance with the error notification signal Nerr.

To be specific, this video packet unit concealer 107 controls the selector switch 108 in accordance with the error notification signal Nerr so as to output, in place of the delayed decoded data DVd corresponding to a video packet (error video packet) whose decoding processing in the decoder 101 fails, the delayed replacement data DVrep of a video packet of the already processed VOP corresponding to the error video packet as the reproduced image data Vout.

Here, the decoder 101 and the memory 102 in the moving picture decoding apparatus 110 as shown in FIG. 13 have the same structures as those of the decoder 101 and the memory 102 in the moving picture decoding apparatus 100 as shown in FIG. 12.

Next, the operation of the moving picture decoding apparatus 110 is described.

In this moving picture decoding apparatus 110, the decoding processing for the input stream Vin in the decoder 101, and outputting of the reference image data Vref and the replacement image data Vrep from the memory 102 is performed in the same way as in the moving picture decoding apparatus 100.

In this moving picture decoding apparatus 110, the decoded image data Vd from the decoder 101 are delayed by the first delay circuit 103 for a time required for the decoding processing for a target video packet to be decoded, and the replacement image data Vrep from the memory 102 are delayed by the second delay circuit 104 for a time required for the decoding processing for the target video packet.

In the error detector 121, the processing of detecting the failure of the decoding processing for the input stream is performed in accordance with the internal signal Si in the decoder 101. When the failure of the decoding processing is detected, the error notification signal Nerr indicating the detection of the error is output to the video packet unit concealer 107. This video packet unit concealer 107 outputs the control signal Cvp to the selector switch 108 in accordance with the error notification signal Nerr. The selector switch 108 selects one of the delayed decoded data DVd from the first delay circuit 103 and the delayed replacement data DVrep from the second delay circuit 104 in accordance with the control signal Cvp, and outputs the selected data (VP unit selected data) Evp as the reproduced image data Vout.

To be more specific, the selector switch 108 is controlled by the video packet unit concealer 107 so that, in place of the delayed decoded data DVd corresponding to the video packet in which the error is detected (error video packet), the delayed replacement data DVrep of the video packet of the already processed VOP, corresponding to the error video packet, are output as the reproduced image data Vout.

The reproduced image data Vout of the target VOP are recorded in the memory 102 as the reference image data for the VOP subsequent to the target VOP.

The so-constructed moving picture decoding apparatus 110 detects the failure of the decoding processing, and replaces the decoded image data Vd of the video packet whose decoding processing fails, with the decoded image data of the corresponding video packet in the already processed VOP. The decoding processing normally fails when the input stream includes errors. Therefore, when the bitstream including the transmission errors or stream errors is input, the concealment of the decoded image data is performed.

However, the above-mentioned conventional moving picture decoding apparatus, i.e., the conventional moving picture decoding apparatus 100 which conceals the decoded image data in macroblock units (see FIG. 12) and the conventional moving picture decoding apparatus 110 which conceals the decoded image data in video packet units (see FIG. 13) have following problems, respectively.

To be specific, the moving picture decoding apparatus 100 as shown in FIG. 12 detects errors using the analog signal level of the input stream or the error-correcting codes, and conceals the decoded image data in macroblock units, whereby the decoded image data can be concealed carefully. However, the stream errors cannot be detected using the analog signal level of the input stream or the error-correcting codes. Therefore, the deterioration in image quality of the decoded image due to the stream errors cannot be reduced.

The moving picture decoding apparatus 110 as shown in FIG. 13 detects errors on the basis of the occurrence of the failure in the decoding processing, and conceals the decoded image data in video packet units. Therefore, the decoded image data corresponding to the normal macroblock information including no error part, precedent to the error macroblock are also replaced with the decoded image data of the already processed VOP. Thus, the image quality of the decoded image is considerably deteriorated due to the concealment of the decoded image data and thereby the concealment of the transmission errors or stream errors in the decoded image cannot be performed effectively.

Therefore, conventionally, the moving picture decoding apparatus which conceals the decoded image in macroblock units as shown in FIG. 12 and the moving picture decoding apparatus which conceals the decoded image in video packet units as shown in FIG. 13 are used properly according to their purposes.

Further, both of the above-mentioned conventional moving picture decoding apparatus have the structures in which the concealment processing for the decoded image is performed without distinction between the case where the input stream has the shape information and the case where the input stream has no shape information. Therefore, in the case where the input stream has the shape information, a good image quality is not obtained even when the concealment of the image is performed.

That is, there are many cases where objects as the targets of the coding processing in object units have the shapes which considerably vary from moment to moment. Therefore, when the image of a part of the target VOP is concealed utilizing an image in the already processed VOP, the continuity in shape within the target VOP is often harmed between concealed parts and unconcealed parts in the target VOP. When the continuity in shape is harmed, the concealed parts show and the image quality is substantially deteriorated.

SUMMARY OF THE INVENTION

It is an object of the present invention to provide a moving picture decoding method and a moving picture decoding apparatus, which can effectively improve image quality deteriorated due to transmission errors or stream errors in decoded images which are obtained by the decoding processing for input streams by concealment processing for the decoded images, and a recording medium which contains a moving picture decoding program for implementing the moving picture decoding method by software.

According to a 1st aspect of the present invention, there is provided a moving picture decoding method of subjecting a bitstream including coded data which are obtained by successively coding image data corresponding to a moving picture for each of first processing units and synchronization signals each of which is added to the coded data for each second processing unit including a plurality of the first processing units, to decoding processing of decoding the coded data for each of the first processing units and generating decoded image data, comprising: an error detection process of detecting a first error occurring during transmission of the bitstream and a second error other than the first error separately; and a concealment process of performing concealment of the decoded image data taking the first processing unit as a concealment unit when the first error is detected, and performing concealment of the decoded image data taking the second processing unit as a concealment unit when the second error is detected. Therefore, the concealment of the decoded image data for both of the transmission error and the stream error can be performed.

In addition, when the transmission error occurs, only decoded image data corresponding to the first processing unit which are affected by the transmission error are concealed.

Therefore, the deterioration in image quality of decoded images due to the concealment of decoded image data corresponding to the first processing unit which are not affected by the transmission error can be avoided. Further, when the stream error other than the transmission error occurs, decoded image data corresponding to the second processing unit having a synchronization signal attached thereto are concealed. Therefore, the deterioration in image quality of decoded images due to output of the decoded image data corresponding to the first processing unit which are affected by the stream error can be prevented.

Consequently, when the error in the input bitstream is detected, the concealment processing for the decoded image data is performed effectively, whereby the deterioration in image quality of the decoded images can be considerably reduced.

According to a 2nd aspect of the present invention, there is provided a moving picture decoding method of subjecting a bitstream including coded data which are obtained by successively coding image data corresponding to a moving picture for each of unit regions constituting one VOP (Video Object Plane) of the moving picture, to decoding processing of decoding the coded data for each of the unit regions and generating decoded image data, comprising: an error detection process of detecting an error in the bitstream; a process of judging whether or not the bitstream has shape information indicating a shape of the moving picture; and a concealment process of performing concealment of the decoded image data taking one VOP of the moving picture as a concealment unit when the error in the bitstream is detected and it is judged that the bitstream has the shape information, and performing concealment of the decoded image data taking a processing region including at least one of the unit regions, which processing region is smaller than the VOP, as a concealment unit when the error in the bitstream is detected and it is judged that the bitstream has no shape information. Therefore, when the bitstream includes the shape information, the deterioration in image quality resulting from the error can be excluded without causing high deterioration in image quality due to the concealment processing for the decoded images. Moreover, when the stream has no shape information, the deterioration in image quality caused by the error can be excluded by the simple concealment processing.

According to a 3rd aspect of the present invention, in the moving picture decoding method of the 2nd aspect, the bitstream includes synchronization signals each of which is added to the coded data for each second processing unit which includes a plurality of first processing units each corresponding to the unit region, the error detection process is a process of detecting a first error occurring during transmission of the bitstream and a second error other than the first error separately, and the concealment process is a process of performing the concealment of the decoded image data taking the first processing unit as the concealment unit when the first error in the bitstream having no shape information is detected, and performing the concealment of the decoded image data taking the second processing unit as the concealment unit when the second error in the bitstream having no shape information is detected. Therefore, the deterioration in image quality in decoded images which are obtained by the decoding processing for the bitstream having shape information due to the transmission error or stream error can be excluded with suppressing the deterioration in image quality resulting from the concealment of the decoded image data. Besides, when the bitstream has no shape information, the concealment processing for the error of the decoded image data is performed effectively according to the types of the error, whereby the image quality of the decoded images can be improved.

According to a 4th aspect of the present invention, there is provided a moving picture decoding apparatus which subjects a bitstream including coded data which are obtained by successively coding image data corresponding to a moving picture for each of first processing units and synchronization signals each of which is added to the coded data for each second processing unit which includes a plurality of the first processing units, to decoding processing, comprising: a decoder for decoding the coded data included in the bitstream for each of the first processing units and generating decoded image data; a first error detector for detecting a first error occurring during transmission of the bitstream; a second error detector for detecting a second error other than the first error; a first concealer for performing concealment of the decoded image data taking the first processing unit as a concealment unit when the first error is detected; and a second concealer for performing concealment of the decoded image data taking the second processing unit as a concealment unit when the second error is detected. Therefore, the concealment of the decoded image data can be performed in appropriate processing units according to whether the error is the transmission error or stream error, in the same way as in the moving picture decoding method according to the 1st aspect of the present invention. Accordingly, when the error in the input bitstream is detected, the concealment processing for the decoded image data is performed effectively, whereby the deterioration in image quality of decoded images is considerably reduced.

According to a 5th aspect of the present invention, there is provided a moving picture decoding apparatus which subjects a bitstream including coded data which are obtained by successively coding image data corresponding to a moving picture for each of unit regions constituting one VOP of the moving picture, to decoding processing, comprising: a decoder for decoding the coded data included in the bitstream for each of the unit regions and generating decoded image data; an error detector for detecting an error in the bitstream; a unit for judging whether or not the bitstream has shape information indicating a shape of the moving picture; and a decoded image concealer for performing concealment of the decoded image data taking one VOP of the moving picture as a concealment unit when the error in the bitstream is detected and it is judged that the bitstream has the shape information, and performing concealment of the decoded image data taking a processing region including at least one of the unit regions, which processing region is smaller than the VOP, as a concealment unit when the error in the bitstream is detected and it is judged that the bitstream has no shape information. Therefore, when the stream includes the shape information, the deterioration in image quality resulting from the error can be excluded without causing high deterioration in image quality due to the concealment processing for the decoded images. Besides, when the stream has no shape information, the deterioration in image quality due to the error can be excluded by the simple concealment processing.

According to a 6th aspect, in the moving picture decoding apparatus of the 5th aspect, the bitstream includes synchronization signals each of which is added to the coded data for each second processing unit which includes a plurality of first processing units each corresponding to the unit region, the error detector comprises: a first error detector for detecting a first error occurring during transmission of the bitstream; and a second error detector for detecting a second error other than the first error, and the decoded image concealer comprises: a first concealer for performing the concealment of the decoded image data taking the first processing unit as the concealment unit when the first error in the bitstream having no shape information is detected; a second concealer for performing the concealment of the decoded image data taking the second processing unit as the concealment unit when the second error in the bitstream having no shape information is detected; and a third concealer for performing the concealment of the decoded image data taking one VOP of the moving picture as the concealment unit when one of the first error and the second error in the bitstream having the shape information is detected. Therefore, the deterioration in image quality of the decoded image having the shape due to the transmission error or stream error can be excluded with suppressing the deterioration in image quality resulting from the concealment of the decoded image data. Besides, when the bitstream has no shape information, the concealment processing for the error of the decoded image data can be performed effectively according to the types of error, whereby the image quality of the decoded image is improved.

According to a 7th aspect of the present invention, there is provided a medium which contains a program for implementing data processing for a bitstream including coded data which are obtained by successively coding image data corresponding to a moving picture for each of first processing units and synchronization signals each of which is added to the coded data for each second processing unit including a plurality of the first processing units, by a computer, and the data processing comprises: a decoding process of decoding the coded data included in the bitstream for each of the first processing units and generating decoded image data; an error detection process of detecting a first error occurring during transmission of the bitstream and a second error other than the first error separately; and a concealment process of performing concealment of the decoded image data taking the first processing unit as a concealment unit when the first error is detected, and performing concealment of the decoded image data taking the second processing unit as a concealment unit when the second error is detected. Therefore, a moving picture decoding method in which the concealment processing for the decoded image data is performed effectively according to whether the error is the transmission error or stream error, thereby improving the image quality of decoded images can be realized by software.

According to an 8th aspect of the present invention, there is provided a medium which contains a program for implementing data processing for a bitstream including coded data which are obtained by successively coding image data corresponding to a moving picture for each of unit regions constituting one VOP of the moving picture, by a computer, and the data processing comprises: a decoding process of decoding the coded data included in the bitstream for each of the unit regions and generating decoded image data; an error detection process of detecting an error included in the bitstream; a process of judging whether or not the bitstream has shape information indicating a shape of the moving picture; and a concealment process of performing concealment of the decoded image data taking one VOP of the moving picture as a concealment unit when the error in the bitstream is detected and it is judged that the bitstream has the shape information, and performing concealment of the decoded image data taking a processing region including at least one of the unit regions, which processing region is smaller than the VOP, as a concealment unit when the error in the bitstream is detected and it is judged that the bitstream has no shape information. Therefore, a moving picture decoding method in the deterioration in image quality resulting from the error can be excluded without causing high deterioration in image quality due to concealment of the decoded image when the bitstream includes the shape information, and besides the deterioration in image quality resulting from the error can be excluded by the simple concealment processing when the bitstream include no shape information can be realized by software.

DETAILED DESCRIPTION OF THE PREFERRED EMBODIMENTS

Hereinafter, embodiments of the present invention will be described.

Embodiment 1

Figure 1A:
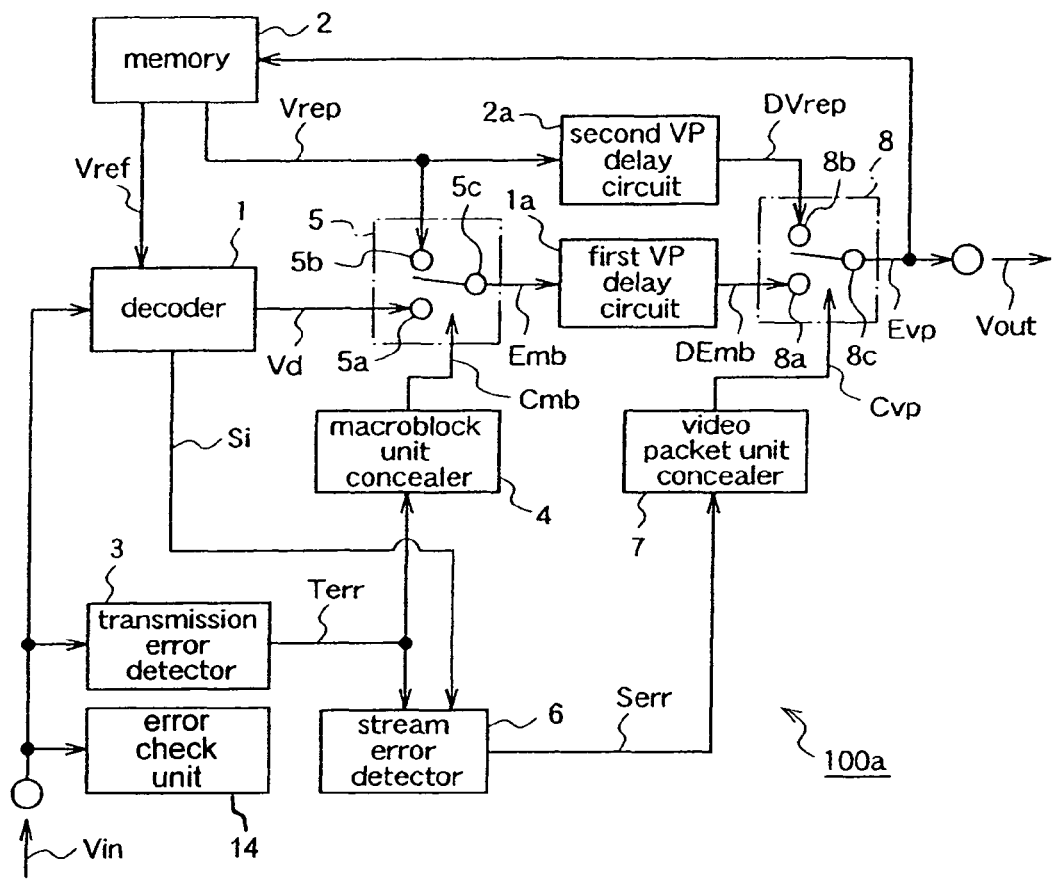
FIGS. 1(a) and 1(b) are diagrams for explaining a moving picture decoding apparatus according to a first embodiment of the present invention, FIG. 1(a) illustrating the structure of the moving picture decoding apparatus and FIG. 1(b) illustrating the data structure of a VOP bitstream which is input to the moving picture decoding apparatus.
Figure 1B:
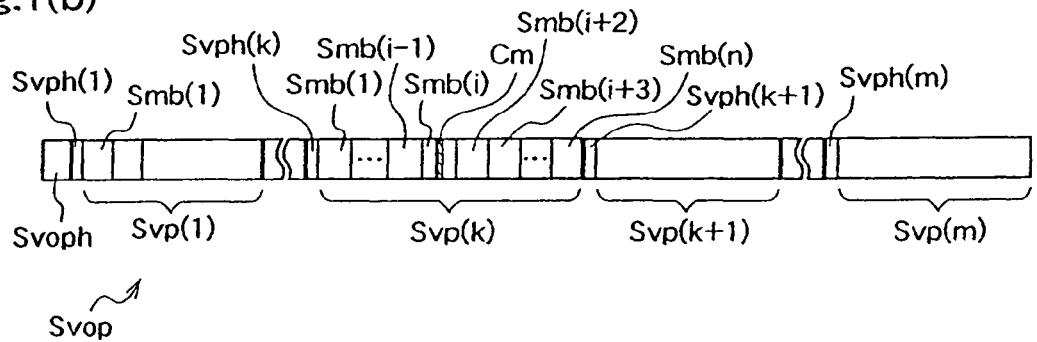

FIGS. 1(a) and (b) are diagrams for explaining a moving picture decoding apparatus according to a first embodiment of the present invention. FIG. 1(a) illustrates the structure of the moving picture decoding apparatus. FIG. 1(b) illustrates the data structure of a VOP bitstream which is input to the moving picture decoding apparatus.

The moving picture decoding apparatus 100a according to the first embodiment performs processing of decoding a bitstream which is input as image coded information to generate decoded image data. In the decoding processing, the decoded image data are concealed in macroblock units when a transmission error is detected and the decoded image data are concealed in video packet units when a stream error other than the transmission error is detected.

Here, each of VOP bitstreams constituting the bitstream, corresponding to each VOP of one image sequence, is divided in plural data units (video packets) comprising a fixed length code (marker code) of a specific bit pattern as a synchronization signal and coded information subsequent to the marker code. The coded information of each video packet includes plural pieces of macroblock information as data units, each corresponding to a macroblock. Thus, the VOP bitstream has a two-layer data structure which is divided by data processing units (second processing units) each corresponding to the video packet, and data processing units (first processing units) each corresponding to the macroblock.

To be more specific, the moving picture decoding apparatus 100a according to the first embodiment has a decoder 1 for subjecting VOP bitstreams constituting a bitstream Vin which is input as image coded information (hereinafter referred to as input bitstream) to decoding processing including the variable-length decoding, and a memory 2 temporarily containing decoded image data Vout corresponding to an already processed VOP whose decoding processing is finished and outputting a part of the contained decoded image data as reference image data Vref which are referred to during the decoding processing and replacement image data Vrep which are used for concealment processing. In this case, the decoder 1 and the memory 2 have the structures identical to those of the decoder 101 and the memory 102 in the conventional moving picture decoding apparatus 100 and 110.

Further, the moving picture decoding apparatus 100a has an MB selector switch 5 for selecting one of the decoded image data Vd from the decoder 1 and the replacement image data Vrep from the memory 2 in accordance with an MB selection control signal Cmb, and outputting the selected image data as MB selected image data Emb; a first VP delay circuit 1a for delaying the MB selected image data Emb for a time required for the decoding processing of a target video packet to be processed; a second VP delay circuit 2a for delaying the replacement image data Vrep which are output from the memory 2 in synchronization with the decoding processing of each macroblock for a time required for the decoding processing of the target video packet; and a VP selector switch 8 for selecting one of the output of the first delay circuit 1a (MB delayed selected data) DEmb and the output of the second delay circuit 2a (delayed replacement data) DVrep in accordance with a VP selection control signal Cvp, and outputting the selected image data as VP selected image data Evp.

Here, the MB selector switch 5 has a first input terminal 5a to which the decoded image data Vd from the decoder 1 are supplied, a second input terminal 5b to which the replacement image data Vrep from the memory 2 are supplied, and an output terminal 5c for outputting the MB selected image data Emb. The MB selector switch 5 can be switched in accordance with the MB selection control signal Cmb between the state where the first input terminal 5a is connected to the output terminal 5c and the state where the second input terminal 5b is connected to the output terminal 5c. The VP selector switch 8 has a first input terminal 8a to which the MB delayed selected data DEmb from the first VP delay circuit 1a are supplied, a second input terminal 8b to which the delayed replacement data DVrep from the second VP delay circuit 2a are supplied, and an output terminal 8c for outputting the VP selected image data Evp. The VP selector switch 8 can be switched in accordance with the VP selection control signal Cvp between the state where the first input terminal 8a is connected to the output terminal 8c and the state where the second input terminal 8b is connected to the output terminal 8c.

Further, this moving picture decoding apparatus 100a has a transmission error detector 3 for detecting transmission errors in the input stream Vin and outputting a transmission error notification signal Terr; and a stream error detector 6 for detecting stream errors in the input stream Vin on the basis of the transmission error notification signal Terr from the transmission error detector 3 and an internal signal Si of the decoder 1, and outputting a stream error notification signal Serr.

The transmission error detector 3 detects the transmission error on the basis of a marker code indicating the absence of the packet in the input stream Vin, like the error detector 120 in the conventional moving picture decoding apparatus 100. The marker code is inserted into the input stream by an error check unit 14 which is provided in the previous stage of the moving picture decoding apparatus 100a. The error check unit 14 specifies the position of a defect caused by the transmission error in the input stream on the basis of the analog signal level of the input stream or error-correcting codes, and inserts the marker code in this defective position.

To be specific, only when the stream error detector 6 detects the failure of the decoding processing for the input stream Vin on the basis of the internal signal Si of the decoder 1 and detects that no transmission error occurs on the basis of the transmission error notification signal Terr, the detector 6 outputs the stream error notification signal Serr as a signal indicating that the stream error is detected. The stream error detector 6 can have a structure for strictly examining the structure and contents of the bitstream in the video packet, instead of detecting the failure of the decoding processing, and outputting the stream error notification signal Serr only when the detector 6 detects the abnormality of the bit stream and detects that no transmission error occurs.

Further, the moving picture decoding apparatus 100a has a macroblock unit concealer 4 for controlling the MB selector switch 5 in accordance with the MB selection control signal Cmb on the basis of the transmission error notification signal Terr, and replacing a part which is affected by the transmission error in the decoded image data Vd of the target VOP with the decoded image data (replacement image data) Vrep of the already processed VOP in macroblock units; and a video packet unit concealer 7 for controlling the VP selector switch 8 in accordance with the VP selection control signal Cvp on the basis of the stream error notification signal Serr, and replacing a part which is affected by the stream error in the delayed image data DVd of the target VOP with the delayed replacement data DVrep of the already processed VOP in video packet units.

Figure 12:
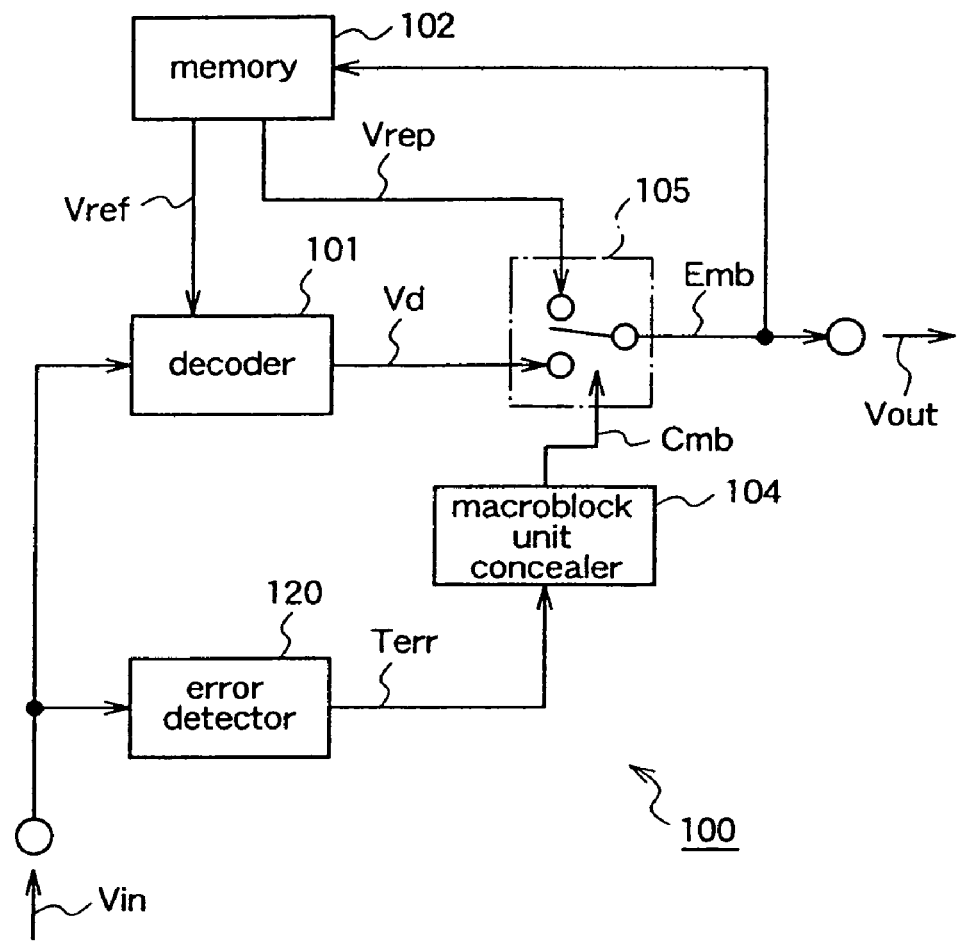
FIG. 12 is a block diagram for explaining a conventional common moving picture decoding apparatus.
Figure 13:
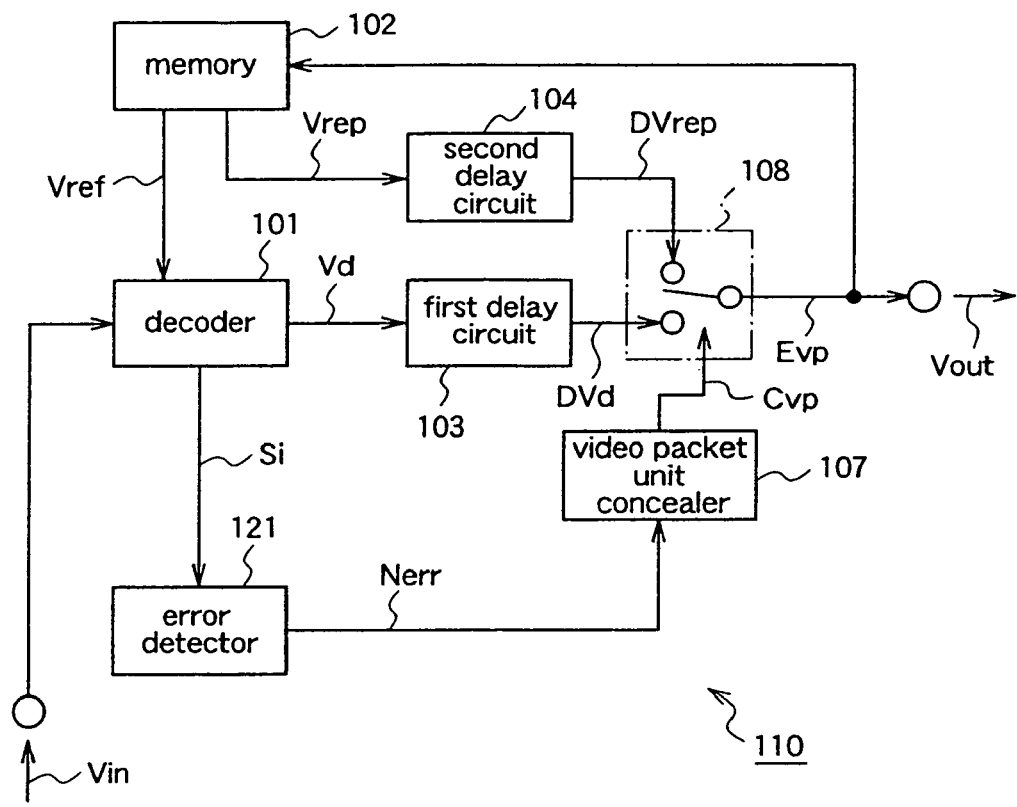
FIG. 13 is a block diagram for explaining a conventional another moving picture decoding apparatus.

The macroblock unit concealer 4 has the same structure as the macroblock unit concealer 104 in the conventional moving picture decoding apparatus 100 as shown in FIG. 12.

Next, the operation of the moving picture decoding apparatus 100a is described.

Initially, a brief explanation is given of the decoding processing by the moving picture decoding apparatus 100a according to the first embodiment.

Figure 2:
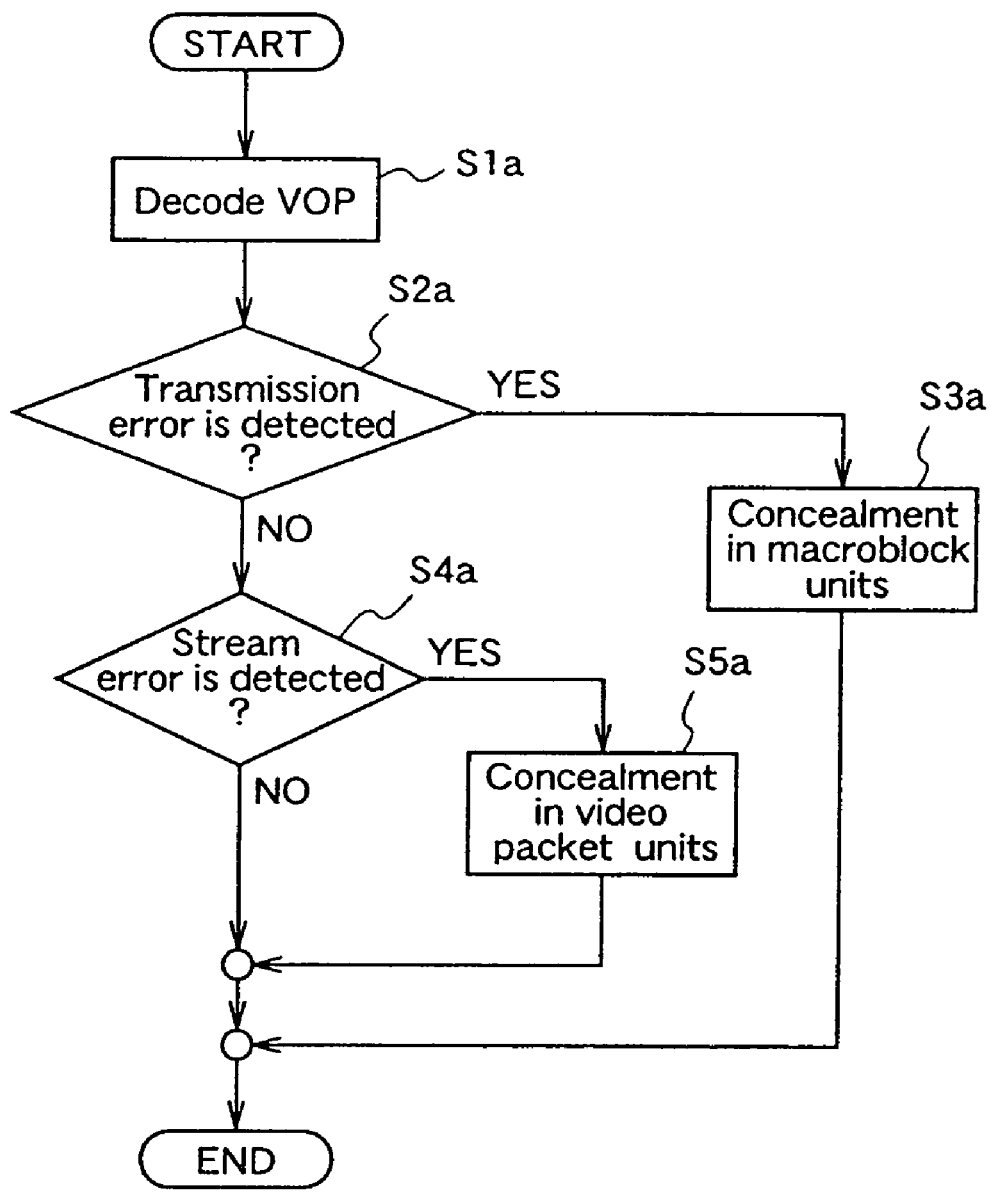
FIG. 2 is a flowchart showing processing of decoding an input stream using the moving picture decoding apparatus of the first embodiment.

FIG. 2 is a flowchart showing the decoding processing by the moving picture decoding apparatus 100a according to the first embodiment.

When the bitstream (input stream) Vin is input as coded information of the image signal to the moving picture decoding apparatus 100a of the first embodiment, the stream of a target VOP is subjected to the decoding processing with reference to the decoded image data Vref of the already processed VOP for each macroblock, and the decoded image data Vd corresponding to each macroblock are generated (step S1a).

Then, the processing of detecting the transmission errors in the input stream Vin is performed (step S2a).

When the transmission error is detected by the transmission error detection processing, the concealment processing for the decoded image data is performed in macroblock units (step S3a). That is, decoded image data of an error macroblock which are obtained from the macroblock information including the transmission error are replaced with decoded image data Vrep of a macroblock in the already processed VOP, corresponding to the error macroblock. On the other hand, when no transmission error is detected as a result of the error detection processing, the processing of detecting the stream errors in the input stream Vin is performed (step S4a).

Only when the stream error is detected by the stream error detection processing, the concealment processing for the decoded image data is performed in video packet units. That is, the delayed decoded data DVd corresponding to the error video packet including the stream error are replaced with the delayed replacement data DVrep corresponding to the error video packet (step S5a).

Hereinafter, the operation of the moving picture decoding apparatus 100a is described in detail.

When the bitstream which is read from a recording medium or the bitstream which is transmitted via a transmission medium is input to the moving picture decoding apparatus 100a as an input stream Vin, the decoding processing for the input stream Vin is performed by the decoder 1 with reference to the decoded image data Vref of the already processed VOP from the memory 2 in this moving picture decoding apparatus 100a. At this time, in the transmission error detector 3, the detection of the transmission error is performed on the basis of the input stream Vin. When the marker code in the input stream is detected, the transmission error notification signal Terr is output to the macroblock unit concealer 4 and the stream error detector 8.

In the macroblock unit concealer 4, the MB selection control signal Cmb is output to the MB selector switch 5 on the basis of the transmission error notification signal Terr. Accordingly, in the MB selector switch 5, one of the decoded image data Vd of the target VOP from the decoder 1 and the decoded image data Vrep of the already processed VOP from the memory 2 is selected for each macroblock, and the selected image data are output as the MB selected image data Emb.

To be specific, when the transmission error is detected, the decoded image data Vd corresponding to macroblock information from the head macroblock information in the VOP bitstream to the macroblock information immediately precedent to the error macroblock information including the marker code are selected by the MB selector switch 5, and output as the MB selected image data Emb. The decoded image data Vd corresponding to macroblock information from the error macroblock information to macroblock information just before the next synchronization signal are not selected by the MB selector switch 5. The decoded image data Vrep of the already processed VOP corresponding to the decoded image data Vd are selected by the MB selector switch 5 as the replacement image data, and the selected data are output as the MB selected image data Emb.

Hereinafter, the operation of the MB selector switch 5 is described in more detail with reference to FIG. 1(b). Here, a description is given of the case where the marker code Cm is included in the i-th macroblock information Smb(i) in the k-th video packet Svp(k) in the input VOP bitstream Svop, i.e., the defect due to the transmission error is included in the macroblock information Smb(i) in the video packet Svp(k).

In this case, decoded image data corresponding to respective macroblock information from the first macroblock information Smb (1) to the (i−1)-th macroblock information Smb (i−1) in the k-th video packet Svp(k) are selected by the MB selector switch 5. Decoded image data corresponding to macroblock information from the i-th macroblock information Smb(i) and thereafter in the k-th video packet Svp(k) are not selected by the MB selector switch 5. In the MB selector switch 5, the decoded image data Vrep of the macroblock in the already processed VOP, corresponding to the decoded image data Vd of these macroblocks are selected as the replacement image data. In this case, the (i+1)-th macroblock information in the k-th video packet Svp(k) is missing due to the transmission error. Further, the (i+2)-th, (i+3)-th, . . . , (n)-th macroblock information Smb(i+2), Smb(i+3), . . . , Smb (n) in the k-th video packet Svp(k) are the (i+2)-th, (i+3)-th, (n)-th macroblock information of the k-th video packet Svp(k) respectively. Here, the macroblock information Smb(i+2)HSmb(n) are information which have been received without transmission errors. However, when the (i+1)-th macroblock information cannot be decoded correctly, the (i+2)-th, (i+3)-th, . . . , (n)-th macroblock information cannot be decoded correctly either. Therefore, decoded image data Vrep corresponding to all of the (i+1)-th to (n)-th macroblock information are replaced with replacement image data.

In FIG. 1(b), Svoph is the header of the VOP bitstream and includes the synchronization signal. In addition, Svp(1), Svp (k+1) and Svp(m) are the first, the (k+1)-th and the last video packets, constituting the VOP bitstream Svoph, respectively. Svph(1), Svph(k), Svph(k+1) and Svph(m) are the headers of the video packets Svp(1), Svp(k), Svp(k+1) and Svp(m), respectively.

In the stream error detector 6, the judgement as to whether or not the transmission error is included in the input stream is made in accordance with the transmission error notification signal Terr from the transmission error detector 3, and the judgement as to whether or not the decoding processing for the input stream Vin fails is made in accordance with the internal signal Si of the decoder 1. Then, the processing of detecting the stream errors in the input stream Vin is performed on the basis of these judgements.

For example, when the decoding processing for the input stream fails, the stream error detector 6 detects the failure of the decoding processing in accordance with the internal signal Si of the decoder 1. At this time, when the detection of the transmission error is notified by the transmission error notification signal Terr, the failure of the decoding processing is caused by the transmission error. Therefore, in this case, the stream error notification signal Serr is not output. On the other hand, when there is no notification of occurrence of the transmission error by the transmission error notification signal Terr, the failure of the decoding processing is caused by the stream error. Therefore, in this case, it is judged that the stream error is included in the input stream, and the stream error notification signal Serr is output to the video packet unit concealer 7.

Here, in the stream error detector 6, it is possible that the detection processing of the stream error is not performed for the video packet including the transmission error in the state where the transmission error detector 3 detects the transmission error.

In the video packet unit concealer 7, the VP selection control signal Cvp is output to the VP selector switch 8 in accordance with the stream error notification signal Serr. Thus, in the VP selector switch 8, one of the delayed selected data DEmb of the target VOP from the first VP delay circuit 1a and the delayed replacement data DVrep of the already processed VOP from the second VP delay circuit 2a is selected for each video packet, and the VP selected image data Evp are output as the reproduced image data Vout from the VP selector switch 8.

To be specific, when the stream error is included in the input stream Vin, the delayed decoded data DVd corresponding to the error video packet in which the decoding processing in the VOP bitstream fails are not selected by the VP selector switch 8 but the delayed replacement data (decoded image data of the video packet in the already processed VOP) DVrep corresponding to the delayed decoded data DVd are selected by the VP selector switch 8, and the selected image data are output as the VP selected image data Evp. On the other hand, the delayed decoded data DVd corresponding to video packets other than the video packet in which the decoding processing fails in the VOP stream are selected by the VP selector switch 8 and the selected image data are output as the VP selected image data Evp.

The VP selected image data Evp are output as the reproduced image data Vout as well as stored in the memory 2 as the reference image data for the following VOP subsequent to the target VOP.

Thus, in the first embodiment, the decoder 1 for decoding the input stream for each macroblock and generating the decoded image data, the transmission error detector 3 for detecting the transmission errors included in the input stream, and the stream error detector 6 for detecting the stream errors included in the input stream are provided. Thereby, the decoded image data of a macroblock which is affected by the transmission error are replaced with the decoded image data of the corresponding macroblock in the already processed VOP, and the decoded image data corresponding to the video packet including the stream error are replaced with the decoded image data of the corresponding video packet of the already processed VOP. Therefore, the concealment for the transmission error of the decoded image data is performed in macroblock units and the concealment for the stream error of the decoded image data is performed in video packet units.

Accordingly, when the transmission error occurs, only the decoded image data of the macroblock which is affected by the transmission error are concealed. Therefore, the deterioration in image quality of the decoded image due to the concealment of the decoded image data of macroblocks which are not affected by the transmission error can be avoided. In addition, when the stream error occurs, the decoded image data of all macroblocks corresponding to the video packet including the stream error are concealed. Therefore, the deterioration in image quality of the decoded image due to the output of the decoded image data of the macroblock which is affected by the stream error can be prevented. Consequently, the concealment processing of the decoded image data for the errors included in the input stream is effectively performed, thereby improving the image quality of the decoded image.

In this first embodiment, the description is given of the case where the input stream has a two-layer data structure, i.e., the case where the VOP bitstreams constituting the input stream are divided in the video packet units and further the video packet is divided in units of macroblocks as coding processing units. However, the two-layer data structure of the input stream is not restricted to that as shown in the first embodiment.

For example, the input stream can have a data structure in which the VOP bitstream is divided in units of video packets and the video packet is divided in units of blocks (8×8 pixels) as minimum units of the coding processing, not in macroblock units. In this case, the concealment for the transmission error of the decoded image data is performed in block units, whereby the same effects as those in the first embodiment can be obtained.

The input stream can have any two-layer data structure as long as the VOP bitstream corresponding to one VOP of the image sequence is divided in units of data each comprising a synchronization signal and coded information subsequent thereto, and this data unit is divided so as to correspond to regions dividing the VOP, as units of the coding processing. In this case, the concealment for the transmission error of the decoded image data is performed in data units (first processing units) corresponding to units of the coding processing, and the concealment for the stream error of the decoded image data is performed in data units (second processing units) each including the synchronization signal, whereby the same effects as those in the first embodiment can be obtained.

Further, in this first embodiment, the input stream having the two-layer data structure is described. However, the input stream can have a data structure of three or more layers. The input stream can have any multi-layer data structure, as long as the input stream is divided into data units (second processing units) each comprising the synchronization signal and coded information subsequent thereto and this data unit is divided so as to correspond to data units (first processing units) corresponding to the unit of the coding processing.

In this first embodiment, the macroblock corresponding to the data unit (first processing unit) which divides the video packet is an image space composed of 16×16 pixels.

However, the number of pixels constituting the macroblock in the horizontal and vertical directions can be varied according to the methods for coding the moving pictures.

Embodiment 2

Figure 3:
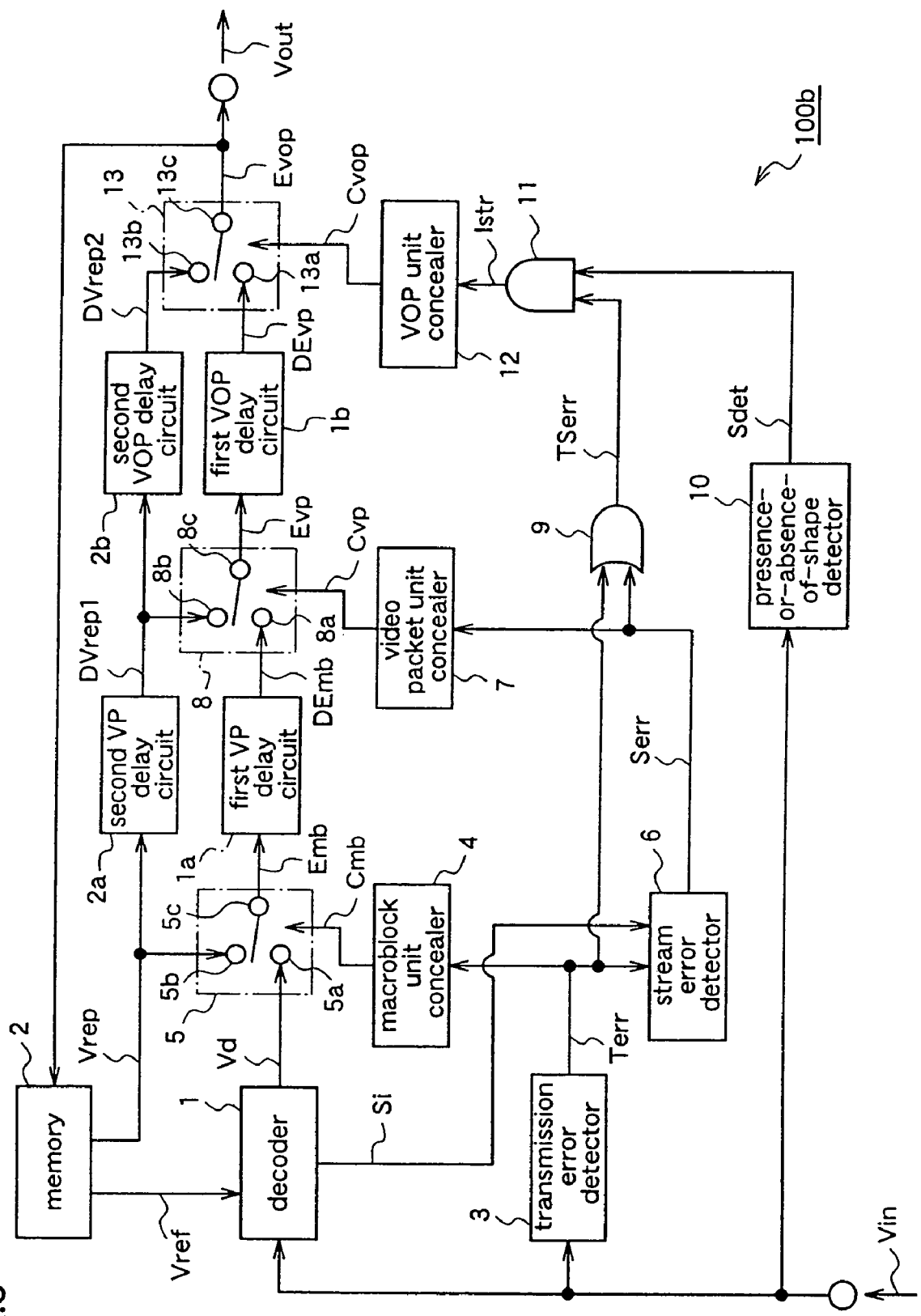
FIG. 3 is a block diagram for explaining a moving picture decoding apparatus according to a second embodiment of the present invention.

FIG. 3 is a block diagram for explaining a moving picture decoding apparatus according to a second embodiment of the present invention.

The moving picture decoding apparatus 100b according to the second embodiment performs concealment of decoded image data in macroblock units when a transmission error is detected and performs concealment of the decoded image data when a stream error is detected in video packet units, as in the first embodiment, in decoding processing of a bitstream corresponding to an object having no shape, and conceals the decoded image data in VOP units when the error is detected in the decoding processing of the bitstream corresponding to an object having the shape.

This moving picture decoding apparatus 100b of the second embodiment has a circuit structure for performing the concealment of decoded image data in VOP units, in addition to the structure of the moving picture decoding apparatus 100a of the first embodiment.

To be specific, this moving picture decoding apparatus 100b of the second embodiment has the decoder 1, the memory 2, the detectors 3 and 6, the concealers 4 and 7, the selector switches 5 and 8, and the delay circuits 1a and 2a, as in the above-mentioned first embodiment.

This moving picture decoding apparatus 100b of the second embodiment has an OR circuit 9 for outputting an error detection signal TSerr indicating that the input stream includes transmission errors or stream errors, on the basis of the OR operation of the transmission error notification signal Terr from the transmission error detector 3 and the stream error notification signal Serr from the stream error detector 6; and a unit for detecting the presence or absence of the shape (hereinafter referred to as presence-or-absence-of-shape detector) 10 for judging whether or not the input stream Vin has the shape information on the basis of the input stream and outputting a signal for notifying the presence or absence of the shape (hereinafter referred to as presence-or-absence-of-shape-notification signal) Sdet according to the judgement result.

In addition, the moving picture decoding apparatus 100b has a first VOP delay circuit 1b for delaying the VP selected image data Evp which are output by the VP selector switch 8 for a time required for the decoding processing of a target VOP to be processed and outputting VOP delayed selected data DEvp; and a second VOP delay circuit 2b for delaying the VP delayed replacement data (first delayed replacement data) DVrep1 which are output by the second VP delay circuit 2a for a time required for the decoding processing of one VOP and outputting VOP delayed replacement data (second delayed replacement data) DVrep2.

Further, the moving picture decoding apparatus 100b has a VOP selector switch 13 for selecting one of the VOP delayed selected data DEvp from the first VOP delay circuit 1b and the VOP delayed replacement data DVrep2 from the second VOP delay circuit 2b in accordance with a VOP selection control signal Cvop, and outputting the selected image data as VOP selected image data Evop; an AND circuit 11 for outputting stream information Istr indicating that the input stream having the shape information includes an error on the basis of the AND operation of the error detection signal TSerr and the presence-or-absence-of-shape-notification signal Sdet; and a VOP unit concealer 12 for controlling the VOP selector switch 13 so that the VOP delayed selected data DEvp from the first VOP delay circuit 1b are concealed in VOP units when the error included in the input stream having the shape information is detected on the basis of the stream information Istr.

The VOP selector switch 13 has a first input terminal 13a to which the VOP delayed selected data DEvp from the first VOP delay circuit 1b are supplied, a second input terminal 13b to which the VOP delayed replacement data DVrep2 from the second VOP delay circuit 2b are supplied, and an output terminal 13c for outputting the VOP selected image data Evop. The VOP selector switch 13 can be switched in accordance with the VOP selection control signal Cvop between the state where the first input terminal 13a is connected to the output terminal 13c and the state where the second input terminal 13b is connected to the output terminal 13c.

Next, the effects are described.

Initially, a description is given of the fundamental principles of the second embodiment.

When decoded image data having shape information of an object are concealed in macroblock units or video packet units, the continuity of the object shape in the VOP is usually harmed. Thus, in the case where the bitstream has the shape information, visually more preferable decoded images are often obtained when decoded image data corresponding to bitstreams including errors are concealed in VOP units, as compared to when the decoded image data are concealed in macroblock units or video packet units.

On the other hand, when the image has no shape information, there are many cases where temporal changes in the shape are small and the correlation of pixel values between VOPs is strong. Therefore, it is preferable that the concealment of the decoded image data is performed in macroblock units or video packet units using the decoded image data of the already processed VOP.

Thus, in this second embodiment, it is judged whether or not the input stream Vin has shape information on the basis of the input stream. When the input stream has the shape information, the decoded image data are subjected to the concealment processing in VOP units. When the input stream has no shape information, the decoded image data are subjected to the concealment processing in macroblock units or video packet units.

Initially, a brief explanation is given of the decoding processing by the moving picture decoding apparatus 100b of the second embodiment.

Figure 4:
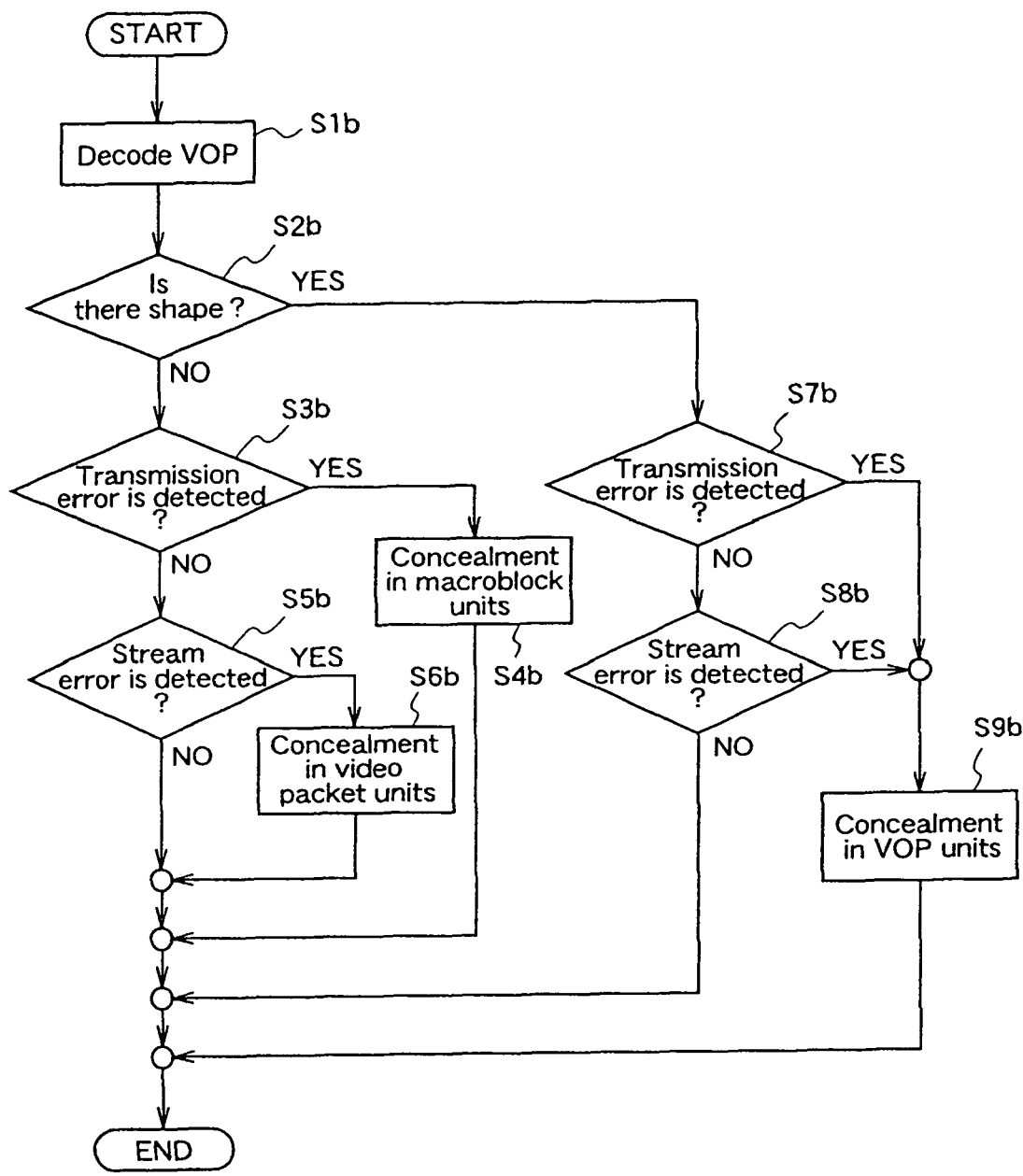
FIG. 4 is a flowchart showing decoding processing by the moving picture decoding apparatus of the second embodiment.

FIG. 4 is a flowchart showing the decoding processing by the moving picture decoding apparatus 100b of the second embodiment.

When a bitstream including coded information corresponding to a moving picture is input as the input stream Vin to the moving picture decoding apparatus 100b of the second embodiment, the processing of decoding the coded information corresponding to a target VOP to be processed in the input stream (target VOP bitstream to be processed) for each macroblock is performed successively in the decoder 1 (step S1b).

Then, it is judged by the presence-or-absence-of-shape detector 10 whether or not the input stream Vin includes a shape signal. As a result of the judgement, when the input stream Vin is a bitstream including no shape information, the same processes as those in steps S2a to S5a in the first embodiment are performed in the respectively corresponding steps Sib to S6b. On the other hand, when the input stream is a bitstream including the shape information, the judgement as to whether or not the input stream Vin includes transmission errors (step S7b) and the judgement as to whether or not the input stream Vin includes stream errors (step S8b) are made.

When the input stream Vin includes either the transmission errors or stream errors, the processing of concealing the decoded image data which are obtained by the decoding processing for the input stream Vin in VOP units is performed (step S9b).

To be specific, when the target VOP bitstream includes an error, the decoded image data DEvp which are obtained by the decoding processing for the target VOP bitstream are replaced with the decoded image data DVrep2 corresponding to the already processed VOP. The decoded image data DVrep2 are output as the reproduced image data Vout from the moving picture decoding apparatus 100b.

On the other hand, when no error is detected in the input stream Vin as a result of the judgements in steps S7b and S8b, the decode image data Vd which are obtained by the decoding processing for the target VOP bitstream are output as the reproduced image data Vout from the moving picture decoding apparatus 100b.

Hereinafter, the operation of the moving picture decoding apparatus 100b is described in detail.

When the same input stream Vin as in the moving picture decoding apparatus 100a of the first embodiment is input to the moving picture decoding apparatus 100b of the second embodiment, the decoding processing for the input stream Vin by the decoder 1, the detection of the transmission errors by the error detector 3, and the detection of the stream errors by the error detector 6 is performed in the moving picture decoding apparatus 100b.

At this time, in the decoder 1, the decoding processing for the input stream Vin is performed for each macroblock and the decoded image data Vd are output for each macroblock. From the memory 2, the decoded image data (replacement image data) Vrep of a macroblock in the already processed VOP, corresponding to the macroblock in the target VOP to be processed by the decoder 1 are output in synchronization with the decoded image data Vd of each macroblock in the target VOP. Further, the transmission error notification signal Terr from the error detector 3 is input to the macroblock unit concealer 4 and the stream error notification signal Serr from the error detector 6 is output to the video packet unit concealer 6. The transmission error notification signal Terr and the stream error notification signal Serr are output to the OR circuit 9.

In the presence-or-absence-of-shape detector 10, it is judged on the basis of the input stream Vin whether or not the input stream Vin includes the shape information, and the presence-or-absence-of-shape-notification signal Sdet indicating the judgement result is output to the AND circuit 11.

Usually, in a VOP bitstream including shape information, information such as flag information indicating that shape information is included in its sequence header or the like is added. Therefore, the judgement as to whether or not the shape information is included is made on the basis of this flag information.

Then, the control for switching the MB selector switch 5 is performed by the macroblock unit concealer 4 and the control for switching the VP selector switch 8 is performed by the video packet unit concealer 6. In the OR circuit 9, the error notification signal TSerr indicating that the input stream includes one of the transmission error or stream error is output to the AND circuit 11 according to the OR operation of the transmission error notification signal Terr and the stream error notification signal Serr.

In this AND circuit 11, the stream information Istr indicating that the input stream is a bitstream having the shape information and includes an error is output to the VOP unit concealer 12 according to the AND operation of the error notification signal TSerr and the presence-or-absence-of-shape-notification signal Sdet.

In the MB selector switch 5, one of the decoded image data Vd and the replacement image data Vrep is selected in accordance with the MB selection control signal Cmb from the macroblock unit concealer 4, and the selected image data are output as the MB selected image data Emb.

The MB selected image data Emb from the MB selector switch 5 and the replacement image data Vrep from the memory 2 are delayed for a time required for the decoding processing for the target video packet by the first and second VP delay circuits 1a and 2a, and output as the VP delayed selected data DEmb and the VP delayed replacement data (first delayed replacement data) DVref1, respectively.

Further, in the VP selector switch 8, one of the VP delayed selected data DEmb and the VP delayed replacement data DVrep1 is selected in accordance with the VP selection control signal Cvp from the video packet unit concealer 7, and the selected delayed data are output as the VP selected image data Evp.

The VP selected image data Evp from the VP selector switch 8 and the VP delayed replacement data DVrep1 from the second VP delay circuit 2a are delayed for a time required for the decoding processing for the target VOP by the first and second VOP unit delay circuits 1b and 2b, and output as the VOP delayed selected data DEvp and the VOP delayed replacement data (second delayed replacement data) DVrep2, respectively.

In the VOP selector switch 13, one of the VOP delayed selected data DEvp and the VOP delayed replacement data DVrep2 is selected in accordance with the VOP selection control signal Cvop from the VOP unit concealer 12, and the selected delayed data are output as VOP selected image data Evop. The VOP selected image data Evop are stored in the memory 2 as well as output as the reproduced image data Vout.

To be specific, the VOP selector switch 13 is controlled by the VOP unit concealer 12 so that the VP delayed selected data Evp from the first VOP delay circuit 1b are output as they are when the input stream includes no shape information or the input stream includes no error, and the VP delayed selected data Evp from the first VOP delay circuit 1b are replaced with the VOP delayed replacement data DVrep2 from the second VOP delay circuit 2b when the input stream has the shape information and includes the error.

Thus, in the second embodiment, the presence-or-absence-of-shape detector 10 for judging whether or not the input stream Vin has the shape information is provided in addition to the structure of the first embodiment. In the case where the input stream Vin has the shape information, when the input stream Vin includes the transmission error or stream error the decoded image data which are obtained by the decoding processing of the input stream Vin are concealed in VOP units. On the other hand, in the case where the input stream Vin has no shape information, the decoded image data are concealed in macroblock units or video packet units according to the type of the error included in the input stream Vin in the same way as in the above-mentioned first embodiment. Therefore, in addition to the effects of the first embodiment, the deterioration of image quality caused by errors in the decoded image which is obtained from the input stream Vin having the shape information can be excluded with suppressing the deterioration in image quality resulting from the concealment of the decoded image data.

In the first and second embodiments, the transmission error detector 3 detects the transmission error by detecting a mark (marker code) inserted in the bitstream, which indicates the absence of the packet. However, the transmission error detector can have a structure for obtaining information relating to the transmission error occurrence position in the input stream from the transmission system in another way and outputting the transmission error notification signal Terr.

Embodiment 3

Figure 5:
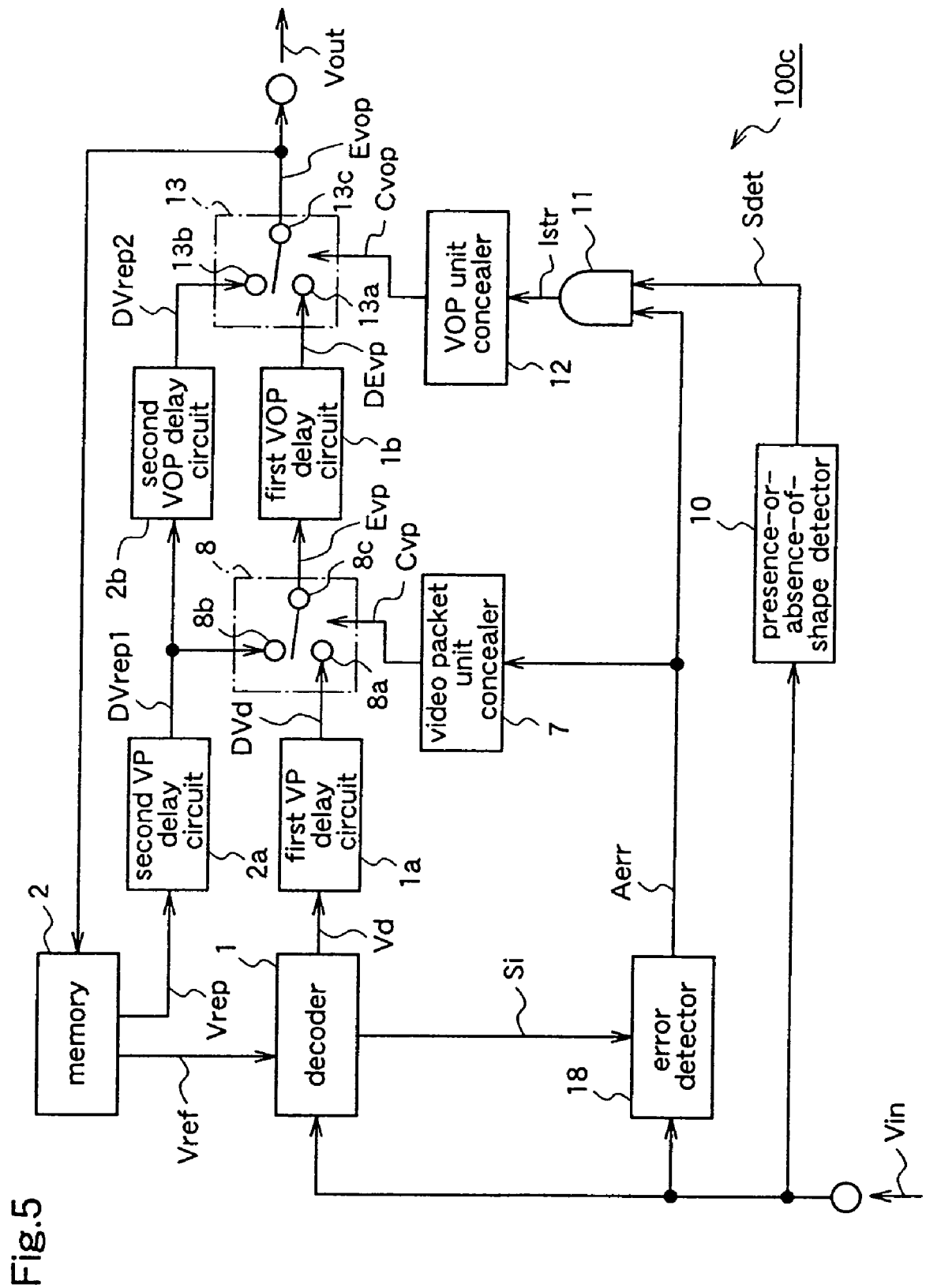
FIG. 5 is a block diagram for explaining a moving picture decoding apparatus according to a third embodiment of the present invention.

FIG. 5 is a block diagram for explaining a moving picture decoding apparatus according to a third embodiment.

This moving picture decoding apparatus 100c of the third embodiment conceals decoded image data in video packet units when an error in an input stream is detected in decoding processing for a bitstream corresponding to an object having no shape, and conceals the decoded image data in VOP units when the error in the input stream is detected in the decoding processing for a bitstream corresponding to an object having the shape.

The moving picture decoding apparatus 100c of the third embodiment has the decoder 1, the memory 2, the concealers 7 and 12, the delay circuits 1a, 2a, 1b and 2b, the selector switches 8 and 13, the AND circuit 11, and the presence-or-absence-of-shape detector 10, like the moving picture decoding apparatus 100b in the second embodiment.

Then, this moving picture decoding apparatus 100c has an error detector 18, in place of the transmission error detector 3, the stream error detector 6 and the OR circuit 9 in the moving picture decoding apparatus 100b in the second embodiment, for performing processing of detecting transmission errors and stream errors on the basis of the input stream Vin and the internal signal Si of the decoder 1, and outputting an error notification signal Aerr when one of the errors is detected.

Further, in this moving picture decoding apparatus 100c, the error notification signal Aerr is input to the video packet unit concealer 7, and the error notification signal Aerr and the presence-or-absence-of-shape-notification signal Sdet from the presence-or-absence-of-shape detector 10 are input to the AND circuit 11.

Further, in this moving picture decoding apparatus 100c, the macroblock unit concealer 4 and the MB selector switch 5 in the moving picture decoding apparatus 100b of the second embodiment are omitted. The output Vd of the decoder 1 is directly input to the first VP delay circuit 1a.

Next, the effects of the moving picture decoding apparatus 100c are described.

According to the second embodiment, in the decoding processing for the bitstream corresponding to an object having no shape, the concealment processing when the transmission error is detected is performed in macroblock units and the concealment processing when the stream error is detected is performed in video packet units. However, when the number of macroblocks corresponding to the video packets is less, i.e., when the number of pieces of the macroblock information included in the video packet is less, the deterioration in image quality resulting from the concealment processing for the decoded image is lower even when the concealment processing for the decoded image data having no shape information is always performed in video packet units.

In addition, when the concealment processing for the decoded image data in macroblock units is omitted, the concealment processing can be simplified.

Thus, in the third embodiment, unlike the second embodiment, when the input stream has no shape information, the concealment processing for the decoded image is performed in video packet units in either case where the transmission error or the stream error is detected as the error in the input stream.

Initially, a brief explanation is given of the decoding processing by the moving picture decoding apparatus 100c of the third embodiment.

Figure 6:
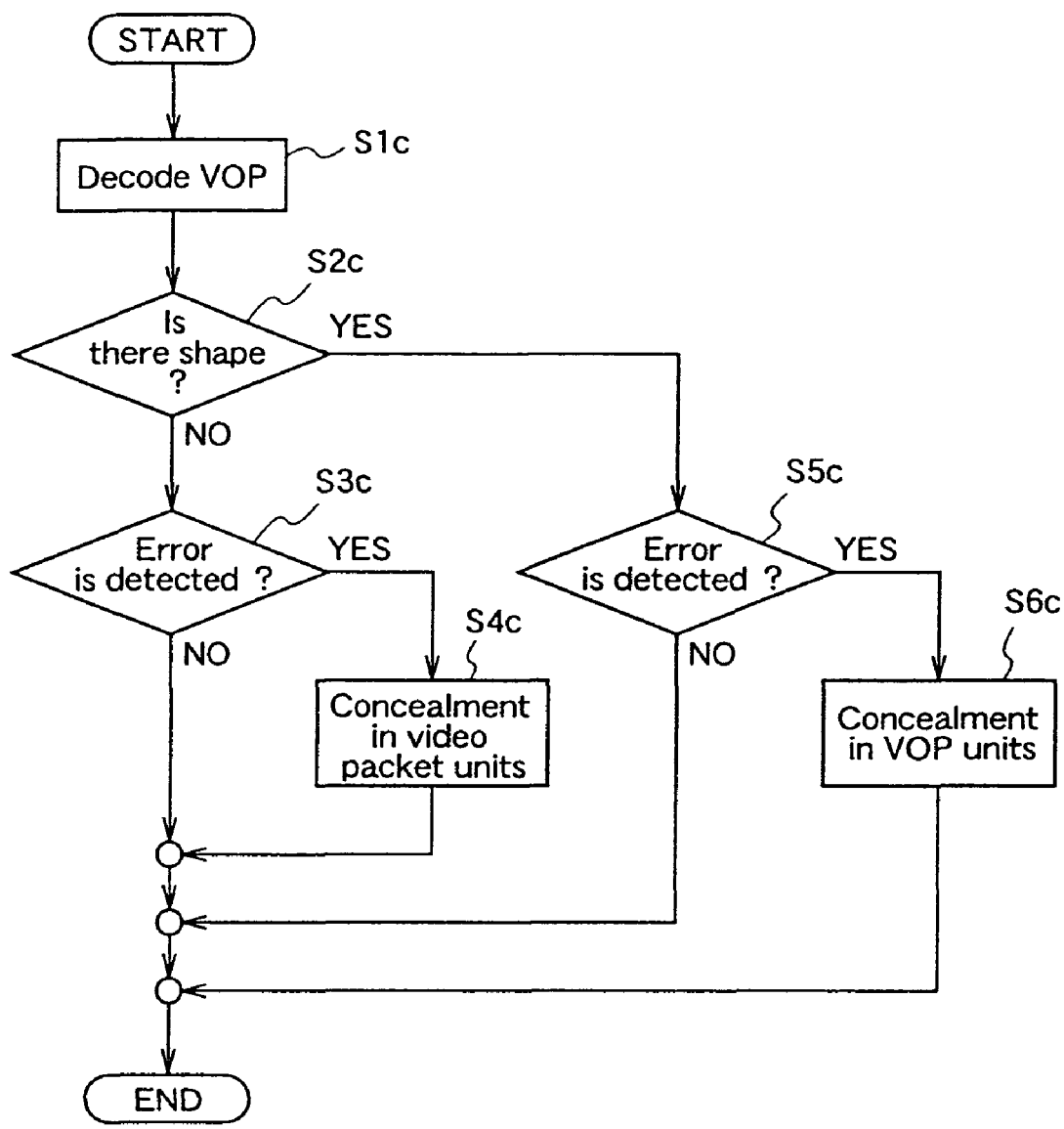
FIG. 6 is a flowchart showing decoding processing by the moving picture decoding apparatus of the third embodiment.

FIG. 6 is a flowchart showing the decoding processing by the moving picture decoding apparatus 100c of the third embodiment.

When the bitstream including coded information corresponding to a moving picture is input to the moving picture decoding apparatus 100c as the input stream Vin, processing of decoding a part (target VOP bitstream to be processed) corresponding to a target VOP to be processed in the input stream for each macroblock is performed successively in the decoder 1 (step S1c).

Then, it is judged by the presence-or-absence-of-shape detector 10 whether or not the input stream Vin includes a shape signal (step S2c).

As a result of the judgement, when the input stream Vin is a bitstream including no shape information, the processing of detecting errors in the input stream Vin is performed by the error detector 18 (step S3c). Then, when the error in the input stream Vin is detected, decoded image data which are obtained by the decoding processing for the input stream Vin are concealed in video packet units (step S4c).

On the other hand, as a result of the judgement in step S2c, when the input stream is a bitstream including the shape information, the processing of detecting the transmission error in the input stream Vin is performed by the error detector 18 (step S5c). Then, when the error in the input stream Vin is detected, the decoded image data which are obtained by the decoding processing for the input stream Vin are concealed in VOP units (step S6c).

As a result of the judgements in steps S3c and S6c, when no error is detected in the input stream Vin, the decoded image data Vd which are obtained by the decoding processing for the target VOP stream are output as reproduced image data Vout from the moving picture decoding apparatus 100c.

Hereinafter, the operation of the moving picture decoding apparatus 100c is described in detail.

When the same input stream Vin as in the moving picture decoding apparatus 100a of the first embodiment is input to the moving picture decoding apparatus 100c of the third embodiment, the processing of detecting whether or not the input stream Vin includes the shape information is performed by the presence-or-absence-of-shape detector 10 in this moving picture decoding apparatus 100c as in the second embodiment, and the presence-or-absence-of-shape-notification signal Sdet is output. In the decoder 1 of the moving picture decoding apparatus 100c, the decoding processing for the input stream Vin is performed and the decoded image data corresponding to the target VOP are output for each macroblock, as in the second embodiment. At this time, from the memory 2, the decoded image data (replacement image data) Vrep of a macroblock in the already processed VOP, corresponding to a macroblock in the target VOP to be processed by the decoder 1 are output in synchronization with the decoded image data Vd of each macroblock in the target VOP.

In the error detector 18 of the third embodiment, the processing of detecting errors in the input stream Vin is performed on the basis of the input stream Vin and the internal signal Si of the decoder 1. When the error is detected, the error notification signal Aerr is output to the video packet unit concealer 7 and the AND circuit 11. In this AND circuit 11, the AND operation of the error notification signal Aerr and the presence-or-absence-of-shape-notification signal Sdet is executed and the stream information Istr indicating that the input stream is a bitstream having the shape information and includes the error is output to the VOP unit concealer 12.

In addition, the decoded image data Vd from the decoder 1 and the replacement image data Vrep from the memory 2 are delayed by the first and second VP unit delay circuits 1a and 2a for a time required for the decoding processing for the target video packet, and output as the VP delayed decoded data DVd and the VP delayed replacement data DVrep1, respectively.

In the VP selector switch 8, one of the VP delayed decoded data DVd and the VP delayed replacement data DVrep1 is selected in accordance with the VP selection control signal Cvp from the video packet unit concealer 7, and the selected delayed data are output as the VP selection image data Evp.

Further, the VP selected image data Evp from the VP selector switch 8 and the VP delayed replacement data Vrep1 from the second VP delay circuit 2a are delayed by the first and second VOP delay circuits 1b and 2b for a time required for the decoding processing for the target VOP, and output as the VOP delayed selected data DEvp and the VOP delayed replacement data DVrep2, respectively.

Then, in the VOP selector switch 13, one of the VOP delayed selected data DEvp and the VOP delayed replacement data DVrep2 is selected in accordance with the VOP selection control signal Cvop from the VOP unit concealer 12, and the selected delayed data are output as the VOP delayed selected data Evop. The VOP delayed selected data Evop are stored in the memory 2 as well as output as the reproduced image data Vout.

Here, the VOP selector switch is controlled by the VOP unit concealer 12 so that the VOP delayed selected data DEvp from the first VOP delay circuit 1b are output as they are when it is judged that the input stream has no shape information or no error is detected in the input stream, and the VOP delayed selected data DEvp from the first VOP delay circuit 1b are replaced with the VOP delayed replacement data DVrep2 from the second VOP delay circuit 2b when the it is judged that the input stream has the shape information and the error is detected in the input stream.

Thus, in this third embodiment, the decoded image data which are obtained by the decoding processing for the input stream Vin including the shape information are subjected to the concealment processing for the decoded image in VOP units, and the decoded image data which are obtained by the decoding processing for the input stream Vin including no shape information are subjected to the concealment processing for the decoded image in video packet units. Therefore, when the input stream Vin include the shape information, the deterioration in image quality due to the error can be excluded without high deterioration in image quality due to the concealment processing for the decoded image. Moreover, when the input stream Vin includes no shape information, the deterioration in image quality due to the error can be excluded by the simple concealment processing.

In this third embodiment, when the input stream Vin includes no shape information, the concealment of the decoded image is performed in video packet units. However, the concealment processing for the decoded image when the input stream Vin includes no shape information can be performed in macroblock units.

In this third embodiment, the error detector 18 has the structure for detecting both of the transmission error and the stream error. However, the error detector may have a structure for detecting only one of the transmission error and the stream error.

Further, in the second and third embodiments, the image concealment in VOP units is performed after the image concealment in macroblock units or the image concealment in video packet units is performed. However, the image concealment in VOP units may be performed before the image concealment in macroblock units and the image concealment in video packet units.

Further, in the aforementioned embodiments, as the concrete concealment processing for the decoded image, the processing of replacing the decoded image data corresponding to a target VOP to be decoded with the decoded image data of the already processed VOP for which the decoding processing is finished before the target VOP is shown. However, the concealment processing for the decoded image is not restricted to those in the respective embodiments.

For example, the concealment processing for the decoded image can be performed by replacing the decoded image data of the target VOP with reference image data which are obtained by subjecting decoded image data of an already processed VOP to the motion compensation processing. Further, the concealment processing for the decoded image can be performed by subjecting the decoded image data of the target VOP to the intra-frame interpolation processing.

Further, in the aforementioned embodiments, the coding processing and decoding processing conforming to MPEG-4 standard is shown. However, the coding processing and decoding processing can be the ones conforming to standards other than MPEG-4 standard.

Further, when a moving picture decoding program for implementing the moving picture decoding processing according to any of the aforementioned embodiments by a computer is recorded in a data storage medium such as a floppy disk, the moving picture decoding processing according to any of the aforementioned embodiments can be easily implemented in an independent computer system.

FIGS. 7(a)-7(b) are diagrams for explaining the case where the moving picture decoding processing according to any of the aforementioned embodiments is executed by a computer system using a floppy disk which contains the moving picture decoding program.

FIG. 7(a) shows a front view of the floppy disk FD, a cross-sectional view thereof, and a floppy disk body D. FIG. 7(b) shows an example of a physical format of the floppy disk body D.

The floppy disk FD is composed of the floppy disk body D and a case FC which contains the floppy disk body D. On the surface of the floppy disk body D, plural tracks Tr are formed concentrically from the outer circumference of the disk toward the inner circumference. Each track is divided into 16 sectors Se in the angular direction. Therefore, in the floppy disc FD containing the above-mentioned program, data of the program are recorded in the assigned sectors on the floppy disk body D.

FIG. 7(c) shows the system structure for recording the moving picture decoding program in the floppy disk FD and performing the moving picture decoding processing with software by using the moving picture decoding program stored in the floppy disk FD.

When the moving picture decoding program is recorded in the floppy disk FD, data of the moving picture decoding program are written in the floppy disk FD from the computer system Cs via the floppy disk drive FDD. In addition, when the above-mentioned moving picture decoding apparatus is constructed in the computer system Cs by the program recorded in the floppy disk FD, the program is read from the floppy disk FD by the floppy disk drive FDD and then loaded to the computer system Cs.

Figure 7:
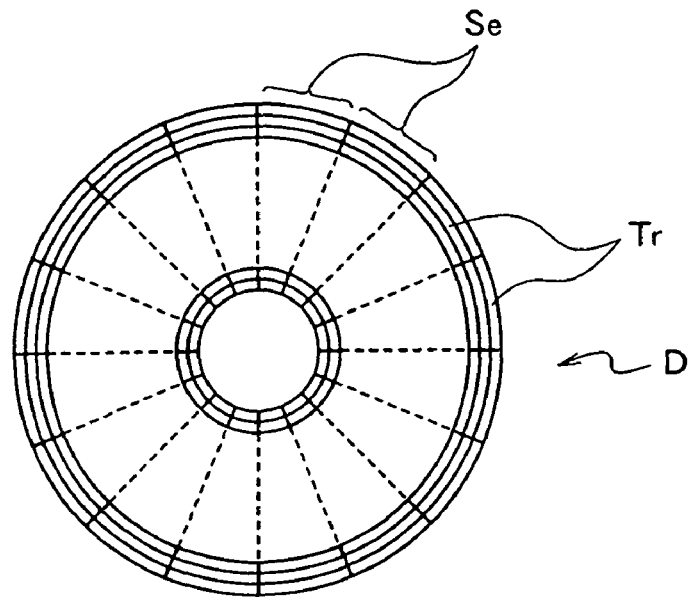
FIGS. 7(a)-7(c) are diagrams for explaining the case where the moving picture decoding processing according to any of the embodiments is implemented using a floppy disk which contains a moving picture decoding program by a computer system, FIGS. 7(a) and 7(b) illustrating the floppy disk and FIG. 7(c) illustrating the computer system.
Figure 7:
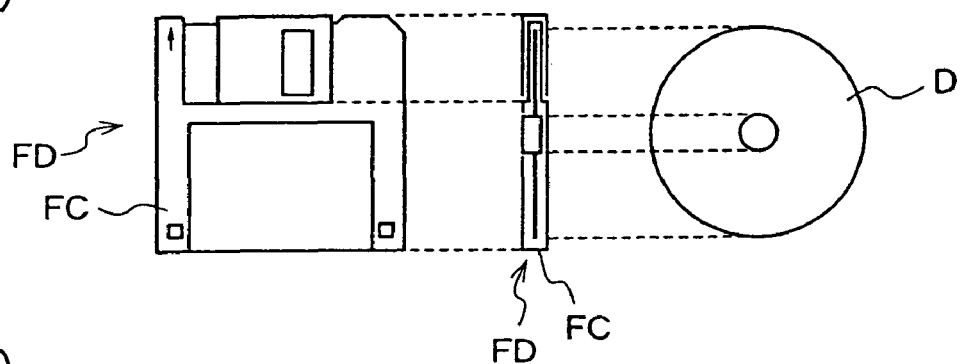
Figure 7:
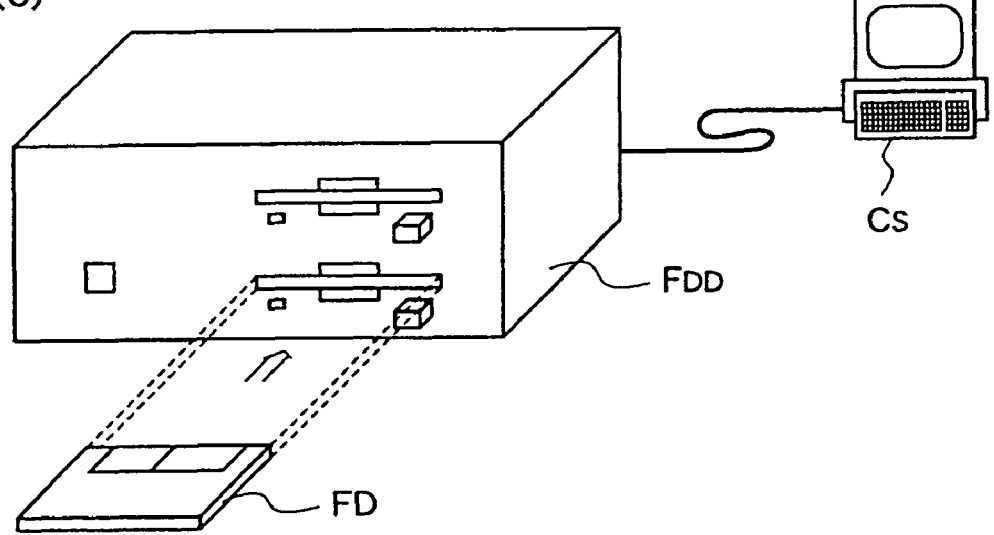
Figure 8:
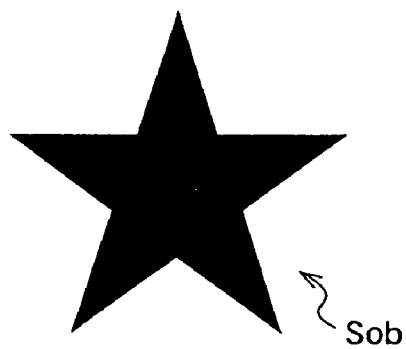
FIGS. 8(a)-8(c) are diagrams for schematically showing various processing units in coding processing conforming to MPEG-4, FIG. 8(a) illustrating the shape of an object, FIG. 8(b) illustrating the texture of the object, and FIG. 8(c) illustrating a rectangular region involving the object.
Figure 8:
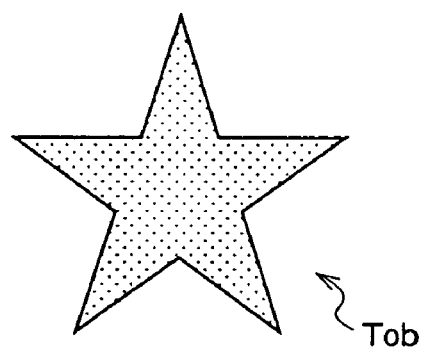
Figure 8:
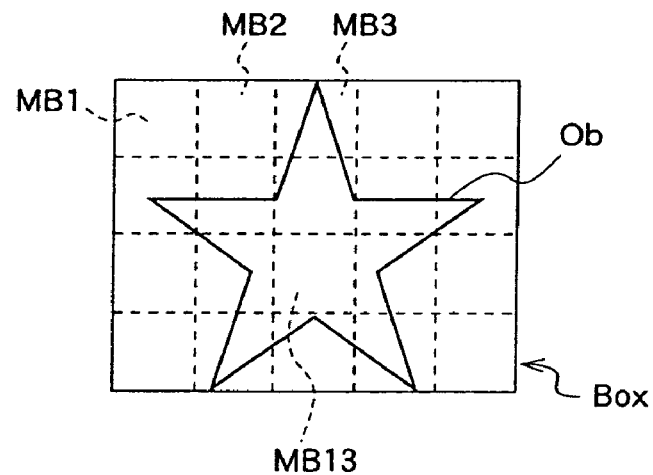
Figure 9:
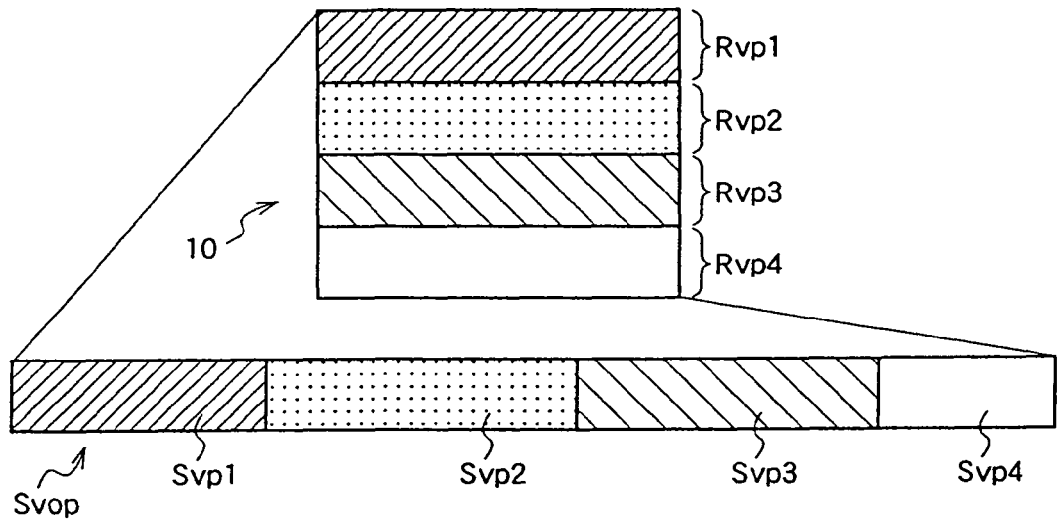
FIGS. 9(a)-9(e) are diagrams for schematically showing various processing units for a bitstream conforming to MPEG-4, FIG. 9(a) illustrating a video packet, FIG. 9(b) illustrating a region corresponding to the video packet in a VOP, FIG. 9(c) illustrating a macroblock, FIG. 9(d) illustrating a block, and FIG. 9(e) illustrating a variation of the video packet.
Figure 9:
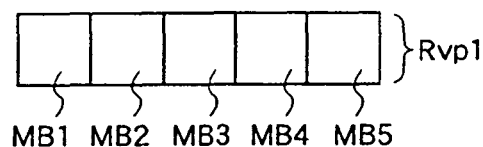
Figure 9:
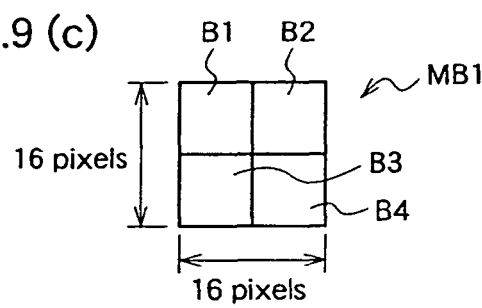
Figure 9:
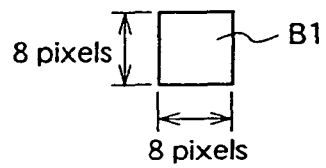
Figure 9:
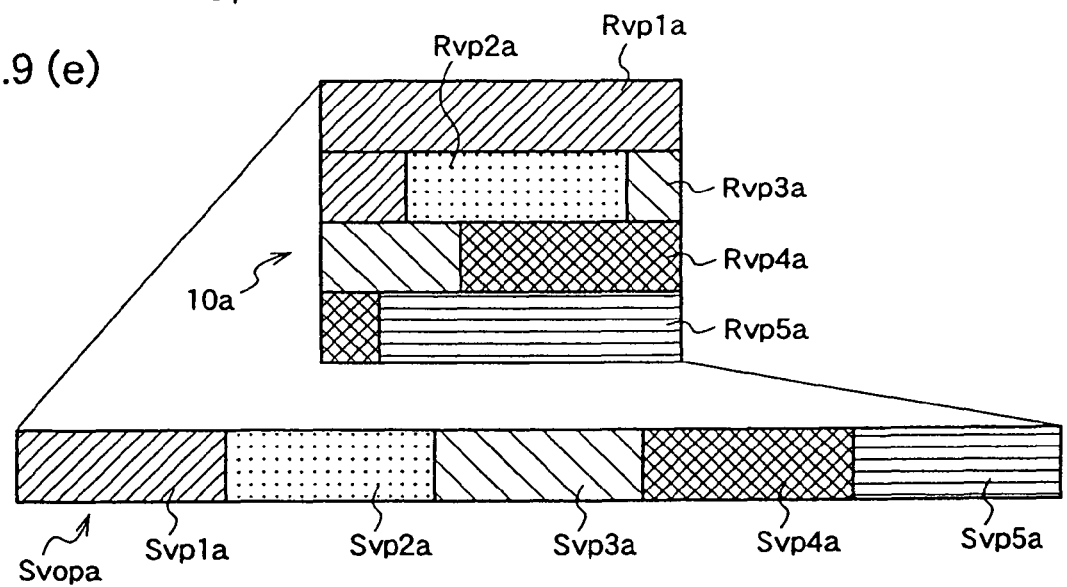
Figure 10:
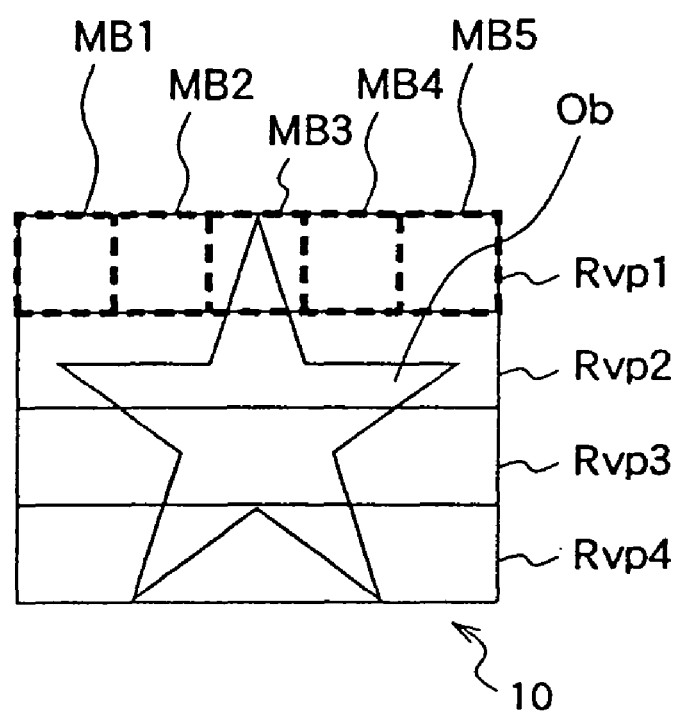
FIG. 10 is a diagram for schematically showing coding processing in object units according to MPEG-4.
Figure 11:
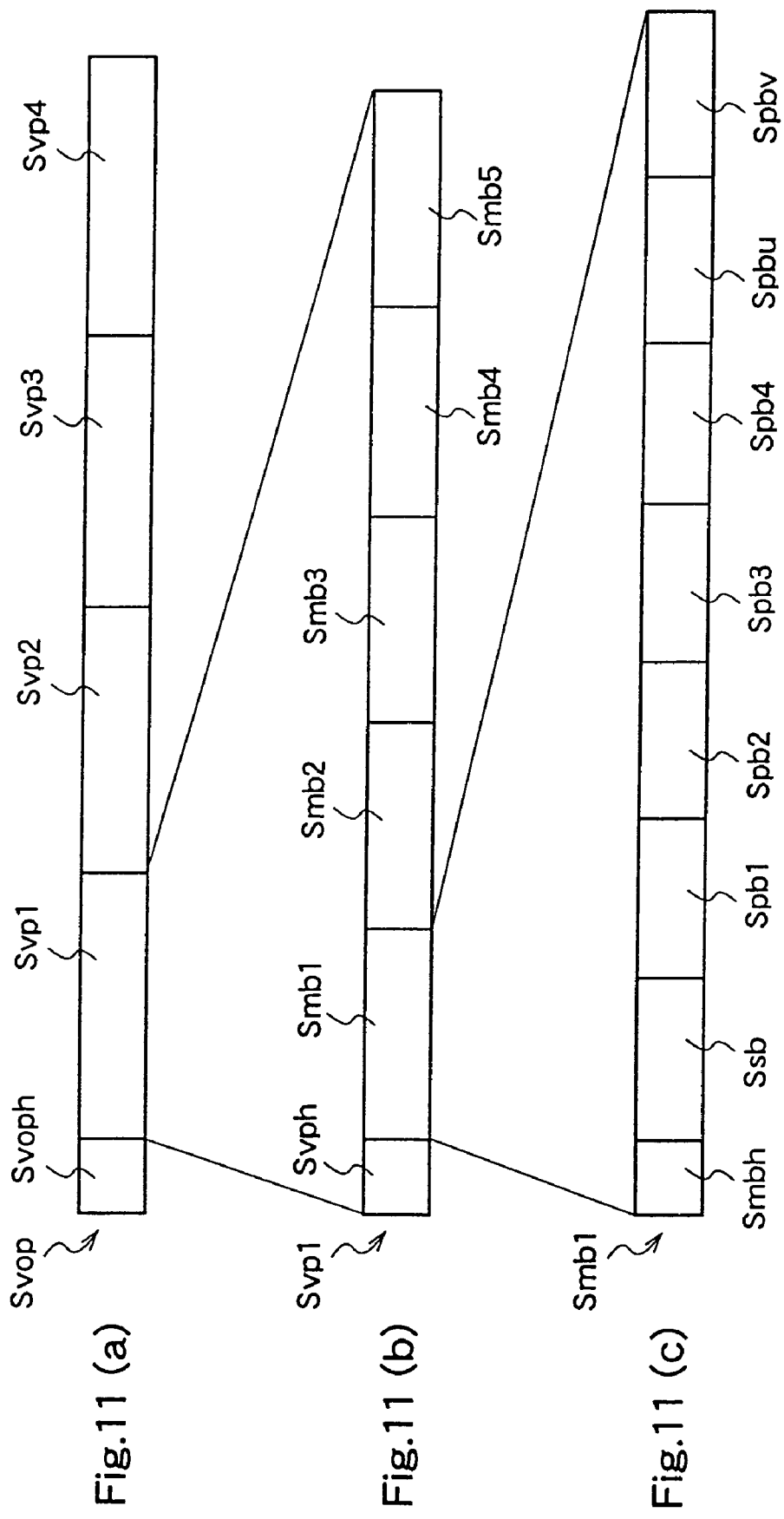
FIGS. 11(a)-11(c) are diagrams for schematically showing the structure of a bitstream according to MPEG-4 in detail, FIG. 11(a) illustrating a VOP bitstream, FIG. 11(b) illustrating a video packet, and FIG. 11(c) illustrating macroblock information.

Although in FIG. 7 a floppy disk is employed as a medium for recording the program, an optical disk may be employed as the program recording medium. Also in this case, the moving picture decoding processing can be performed by software in the same manner as in the case of the floppy disk. Further, the data storage medium is not restricted to the optical disk and the floppy disk, and any medium may be employed as long as it can contain the program, for example, an IC card or a ROM cassette. Also in the case of using these data storage media, the moving picture decoding processing according to any of the aforementioned embodiments can be implemented by software as in the case of using the floppy disk or the like.

What is claimed is:

1. A moving picture decoding apparatus for subjecting a bitstream including coded data which are obtained by successively coding image data corresponding to a moving picture, to decoding processing of decoding the coded data and generating decoded image data, said apparatus including:

a decoding unit for decoding the coded data included in the bitstream and generating decoded image data;

a memory unit for temporarily storing an image data that is temporarily decoded; and a replacement means for, when an error is detected at decoding the bitstream, changing a replacement unit by which the image data that is obtained by decoding the bitstream is to be replaced with the image data stored in the memory unit, according to whether the error is a first error that occurs during transmission of the bitstream or a second error which is detected at decoding the bitstream.

2. The moving picture decoding apparatus of claim 1 wherein the image data stored in the memory unit is decoded image data decoding processing for which has already been completed.

3. The moving picture decoding apparatus of claim 1 wherein, said replacement means replaces, when the second error is detected in decoding the bitstream, the data in which the second error is detected at decoding with the image data stored in the memory unit in a second processing unit which includes a plurality of first processing units so as to prevent propagation of the second error, and replaces, when the first error is included in the bitstream, the data including the first error with the image data stored in the memory unit, for each the first processing units.

4. The moving picture decoding apparatus of claim 3 wherein the image data stored in the memory unit is decoded image data decoding processing for which has already been completed.

5. The moving picture decoding apparatus of claim 3 wherein each of said first processing units is a unit by which decoding of the image data is performed.

6. The moving picture decoding apparatus of claim 3 wherein said second processing unit is a unit which is divided by predetermined fixed-length codes so as to prevent propagation of error.

7. The moving picture decoding apparatus of claim 6 wherein said predetermined fixed-length codes are synchronization signals.

8. The moving picture decoding apparatus of claim 1 wherein said first error is an error an occurrence position of which can be specified.

9. The moving picture decoding apparatus of claim 1 wherein said first error is an error that is caused by a defect of the bitstream.

10. The moving picture decoding apparatus of claim 1 wherein said second error is an error an occurrence position of which cannot be specified.

11. The moving picture decoding apparatus of claim 1 wherein said second error is an error which is detected in decoding the bitstream, other than errors caused by a defect of the bitstream.

12. The moving picture decoding apparatus of claim 1 wherein the second error is an error which is detected in decoding the bitstream when the first error has not occurred.

* * * * *